(12) United States Patent
Tanaka et al.

(10) Patent No.: US 9,703,744 B2
(45) Date of Patent: Jul. 11, 2017

(54) STORAGE DEVICE EMPLOYING PCI-EXPRESS CONNECTION SOLID-STATE DRIVE

(71) Applicant: Hitachi, Ltd., Tokyo (JP)

(72) Inventors: Katsuya Tanaka, Tokyo (JP); Masanori Takada, Tokyo (JP); Naoya Okada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 236 days.

(21) Appl. No.: 14/650,996

(22) PCT Filed: Jan. 23, 2013

(86) PCT No.: PCT/JP2013/051257
§ 371 (c)(1),
(2) Date: Jun. 10, 2015

(87) PCT Pub. No.: WO2014/115257
PCT Pub. Date: Jul. 31, 2014

(65) Prior Publication Data
US 2015/0317272 A1    Nov. 5, 2015

(51) Int. Cl.
*G06F 13/40* (2006.01)
*G06F 13/42* (2006.01)
(Continued)

(52) U.S. Cl.
CPC ........ *G06F 13/4081* (2013.01); *G06F 13/385* (2013.01); *G06F 13/4022* (2013.01);
(Continued)

(58) Field of Classification Search
CPC .......... G06F 13/40; G06F 13/42; G06F 11/14; G06F 11/07; G06F 13/38
See application file for complete search history.

(56) References Cited

U.S. PATENT DOCUMENTS 8,510,592 B1 * 8/2013 Chan .................... G06F 11/0745
714/5.1
8,880,764 B2 * 11/2014 Tsirkin .................... G06F 13/24
710/260
(Continued)

OTHER PUBLICATIONS

Enterprise SSD Form Factor Version 1.0, Dec. 20, 2011, SSD Form Factor Working Group, p. 14 and 31-38.
(Continued)

*Primary Examiner* — Henry Tsai
*Assistant Examiner* — Christopher A Daley
(74) *Attorney, Agent, or Firm* — Mattingly & Malur, PC

(57) ABSTRACT

In a storage subsystem adopting HDD and PCIe-SSD as storage media, as a method for preventing the complication of having to select a removal method while considering the drive type inserted to the drive slot since the method for removing the HDD differs from the method for removing the PCIe-SSD according to the prior art, the present invention provides an LED for displaying whether it is possible to remove the HDD or the PCIe-SSD inserted to the slot of a drive enclosure, wherein when an HDD is inserted in the drive slot, the LED displays that removal of the HDD is enabled when power supply to the HDD is stopped, and when PCIe-SSD is inserted to the drive slot, the LED displays that removal of the SSD is enabled when Downstream Port Containment (DPC) is triggered in the downstream port of the PCIe switch to which the SSD is connected.

9 Claims, 29 Drawing Sheets

(51) Int. Cl.
*G06F 11/14* (2006.01)
*G06F 13/38* (2006.01)

(52) U.S. Cl.
CPC .. *G06F 13/4221* (2013.01); *G06F 2213/0026* (2013.01); *G06F 2213/3802* (2013.01); *G06F 2213/3804* (2013.01)

(56) References Cited

U.S. PATENT DOCUMENTS

| | | | |
|---|---|---|---|
| 9,086,965 B2* | 7/2015 | Adar | G06F 11/0745 |
| 2009/0164694 A1* | 6/2009 | Talayco | G06F 13/4022 710/316 |
| 2009/0327588 A1* | 12/2009 | Sutardja | G06F 3/0658 711/103 |
| 2010/0251014 A1* | 9/2010 | Yagi | G06F 11/1441 714/5.11 |
| 2013/0132643 A1* | 5/2013 | Huang | G06F 13/4022 711/103 |
| 2013/0268694 A1* | 10/2013 | Campbell | G06F 13/20 710/8 |
| 2014/0047290 A1* | 2/2014 | Lee | G11C 29/10 714/719 |

OTHER PUBLICATIONS

PCI-SIG Engineering Change Notice, Downstream Port Containment (DPC), 2012, PCI-SIG, pp. 1-20.
PCI-SIG Engineering Change Notice, Enhanced DPC (eDPC), 2012, PCI-SIG, pp. 1-34.

\* cited by examiner

FIG. 9

| Drive Type \ Drive Output Signal | PRSNT# (904) | IfDet# (905) |
|---|---|---|
| SAS HDD (901) | Low | Low |
| PCIe SSD (902) | High | Low |
| No drive (903) | High | High |

FIG.10

| Connection Target \ LED Status | Shutdown LED ON (1003) | Shutdown LED OFF (1004) |
|---|---|---|
| SAS HDD (1001) | No power supply to HDD | Power supplied to HDD |
| PCIe SSD (1002) | DPC triggered in both switch ports connecting SSD | DPC not triggered in one of switch ports connecting SSD |

FIG.15

| Logical Slot Number (1501) | Logical Drive Number (1502) | Media Type (1503) | Port 1 Identification Information (1504) | Port 2 Identification Information (1505) | Drive Identification Information (1506) |
|---|---|---|---|---|---|
| 1 | 5 | SSD | | | |
| 2 | 6 | SSD | | | |
| 3 | 7 | SSD | | | |
| 4 | 8 | HDD | | | |
| 5 | 9 | SSD | | | |

FIG.16

| Logical Slot Number (1601) | DPC Status (1602) | Hot Remove Control (1603) | Shutdown LED Control (1604) | Location LED Control (1605) |
|---|---|---|---|---|
| 1 | 0 | OFF | OFF | OFF |
| 2 | 1 | OFF | OFF | OFF |
| 3 | 2 | OFF | OFF | OFF |
| 4 | 3 | OFF | OFF | OFF |
| 5 | 3 | ON | ON | ON |

| 1800 | 1801 | 1802 | 1803 | 1804 | 1805 | 1806 | 1807 |
|---|---|---|---|---|---|---|---|
| | Logical Slot Number | Physical Slot Number | Backend I/F | DPC Status | Hot Remove Control | Shutdown LED Control | Location LED Control |
| | 10 | | 1 | 0 | OFF | OFF | OFF |
| | 11 | | 2 | 0 | OFF | OFF | OFF |
| | 12 | | 1 | 0 | OFF | OFF | OFF |
| | 13 | | 2 | 0 | OFF | OFF | OFF |

FIG.22

| | SAS HDD attachment process | PCIe SSD attachment process |
|---|---|---|
| Step 1 | Insert drive to drive slot | |
| Step 2 | Confirm start of power supply to HDD by turning off of shutdown LED | Confirm cancel of DPC of SSD connection switch port by turning off of shutdown LED |
| Step 3 | Confirm starting of operation of drive by starting of blinking of activity LED | |

STORAGE DEVICE EMPLOYING PCI-EXPRESS CONNECTION SOLID-STATE DRIVE

TECHNICAL FIELD

The present invention relates to a storage subsystem, and especially relates to a storage subsystem adopting PCI-Express attached solid state drive as storage media.

BACKGROUND ART

In general, a storage subsystem is provided with a nonvolatile storage media that can be accessed randomly. Nonvolatile storage media that can be accessed randomly can be, for example, a magnet disk drive, an optical disk drive and the like. Further, the current mainstream storage subsystem is equipped with multiple hard disk drives (HDDs).

Accompanying the progress of semiconductor technology, nonvolatile semiconductor memories that can be used as the storage media of a storage subsystem have been developed. Such nonvolatile semiconductor memory includes, for example, a flash memory. A flash memory is a semiconductor memory that is nonvolatile like a read only memory (ROM), but enabling write such as a random access memory in addition to read. The storage subsystem having a solid state drive (SSD) with a flash memory as the storage media has superior life, power saving property and access time compared to a storage subsystem having only HDDs.

The storage subsystem has a storage controller for controlling data transfer between the host system connected to the storage subsystem and the storage media within the storage subsystem. The storage controller has a front-end interface connecting the host system, a back-end interface for connecting a large number of drives as storage media, a processor for controlling the storage subsystem, a memory connected to the processor, and so on. Further, a "PCI-Express" (hereinafter also referred to as "PCIe", both being Registered Trademarks) is known as a standard of communication network for connecting the processor, the front-end interface and the back-end interface.

In a prior art storage subsystem, the back-end interface and the plurality of HDDs are connected for example via Serial Attached SCSI (SAS) protocol. Further, the SSD having an SAS interface is also connected to the backend interface.

Recently, an SSD connecting via PCIe to the storage controller with the aim to enhance the performance of the SSD has been provided. Since the PCIe-SSD having the PCIe interface can perform data transfer without having to perform SAS protocol conversion overhead, so that the increase of speed of data transfer is enabled compared to SAS-SSD.

Further, a form factor capable of making the connectors of the HDD having the SAS interface and the PCIe-SSD common to enabling both types of drives mixed within the storage subsystem and to replace the HDD and the PCIe-SSD within the same slot has been standardized.

In order to remove the HDD from the slot of the drive enclosure, it was necessary to remove the HDD from the slot after stopping the rotation of the disk. Therefore, the drive enclosure has LEDs showing the status of power feed to the HDD corresponding to the respective slots to which HDDs are inserted. The operator of the storage subsystem can remove the HDD from the slot when the LED indicates that power supply has been stopped and the stop of rotation of the drive has been ensured.

On the other hand, async removal is considered in PCIe-SSD. Async removal refers to removing the PCIe-SSD from the slot of the drive enclosure without prior notification to the storage controller. Async removal is also called surprise removal.

Non-patent literature 1 discloses an art related to form factor and surprise removal of PCIe-SSD enabling replacement of the HDD and the PCIe-SSD.

Further, non-patent literatures 2 and 3 disclose an art related to async removal of the PCIe-SSD.

CITATION LIST

Non Patent Literature

[NPL 1] "Enterprise SSD Form Factor Version 1.0", 2011, SSD Form Factor Working Group, Pages 14 and 31-38

[NPL 2] "PCI-SIG ENGINEERING CHANGE NOTICE, Downstream Port Containment (DPC)", 2012, PCI-SIG, Pages 1-20

[NPL 3] "PCI-SIG ENGINEERING CHANGE NOTICE, Enhanced DPC (eDPC)", 2012, PCI-SIG, Pages 1-34

SUMMARY OF INVENTION

Technical Problem

When writing of data to the SSD is progressing regarding async removal, failure is recognized to have occurred since writing of data to the SSD fails.

Further, in async removal, the occurrence of failure in SSD and normal removal processing cannot be distinguished. That is, the storage controller cannot distinguish the phenomenon where the SSD fails suddenly and data transfer becomes impossible and the phenomenon where the data transfer becomes impossible due to async removal process.

Therefore, there was a drawback that the storage controller must execute failure handling program every time an async removal processing of SSD is executed.

Further, there is a drawback that the method of removal differs between the HDD and the PCIe-SSD. In other words, when an HDD is inserted to the slot, the operator removes the HDD by waiting for a display indicating that power supply to the HDD has stopped. On the other hand, when an SSD is inserted to the slot, the operator removes the SSD without prior notification to the storage controller. As described, there is a drawback that the operator of the storage subsystem must select the method for removal while considering the type of the drive inserted to the slot.

In consideration of the problems mentioned above, the present invention aims at providing a method for removing the PCIe-SSD safely and easily in a storage subsystem adopting HDD and PCIe-SSD as storage media.

Solution to Problem

In order to achieve the above object, a display means displaying whether removal of the HDD or PCIe-SSD inserted to the slot is enabled or not displays that HDD can be removed when the power supply to the HDD is stopped if an HDD is inserted to the slot, and if an SSD is inserted to the slot, the display means displays that SSD can be removed when a downstream port containment (DPC) has been triggered in the downstream port of the PCI-Express switch (hereinafter referred to as "PCIe switch") connecting the SSD inserted to the slot.

Advantageous Effects of Invention

According to the present invention, the process of removing the HDD and the PCIe-SSD can be made common, and the PCIe-SSD can be removed safely, so that the operator of the storage subsystem can perform removal according to the display means displaying whether removal is enabled or not without being especially conscious of the drive type being the target of removal, and the operation can be executed easily and safely.

BRIEF DESCRIPTION OF DRAWINGS

FIG. 9 is a view showing the method for identifying drives.

FIG. 10 is a view showing a content of display of the shutdown LED according to embodiment 1.

FIG. 15 is a view showing a drive management table according to embodiment 1.

FIG. 16 is a view showing a drive slot management table according to embodiment 1.

FIG. 22 is a view showing a drive attachment process seen from an operator according to embodiment 2.

DESCRIPTION OF EMBODIMENTS

Now, preferred embodiments of the present invention will be described with reference to the drawings. Throughout the embodiments, the components denoted with the same reference numbers are substantially the same.

In the following description, the PCIe switch is simply called a "switch", and the SSD and the cable being the targets of removal are called a "target SSD" and a "target cable". Further, a port of a switch to which the upstream side of the removal target SSD or cable is called a "target switch port". In the case of a dual port SSD, there are two target switch ports. Further, the respective slots to which the upstream side of the target SSD or the target cable is inserted are called a "target drive slot" and a "target cable slot". Further, an "interrupt handler" refers to an interrupt handler executed by an interrupt transmitted when DPC is triggered.

In the following description, the SSD is a PCIe-SSD having a PCIe interface, and the HDD is a SAS-HDD having a SAS interface.

Embodiment 1

Now, the configuration of a storage subsystem and a method for removing the SSD disposed therein according to embodiment 1 of the present invention will be described with reference to FIGS. 1 through 19. Thereafter, for comparison, a prior art SSD removal method will be described with reference to FIGS. 33 and 34.

First of all, we will describe a DPC (Downstream Port Containment) provided in a switch (PCIe switch) used according to the present invention will be described.
<Description of DPC>

Figure 4:
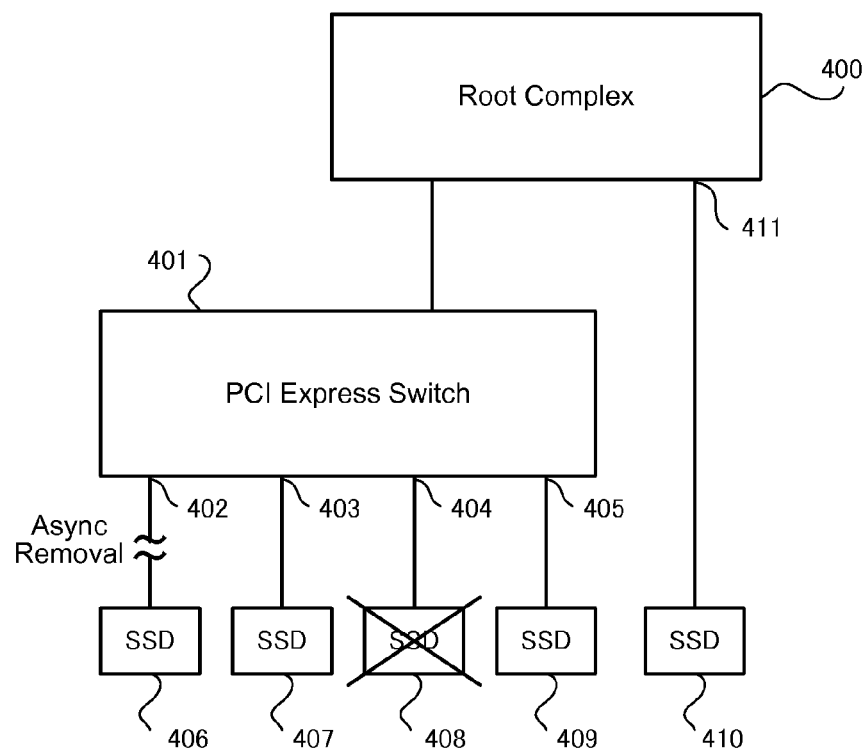
FIG. 4 is a view describing the function of DPC.

FIG. 4 is a drawing describing the function of a DPC disclosed in non-patent literatures 2 and 3. In FIG. 4, downstream ports 402 through 405 of a switch 401 have SSDs 406 through 409 respectively connected thereto. Further, a downstream port 411 of a root complex connected to the switch 401 has an SSD 410 connected thereto.

In the example, a first function of the DPC is to prevent failure of a single SSD from affecting other PCIe-attached components. A second function of the DPC is to realize async removal of the SSD.

Regarding the first function of the DPC, the DPC adds a function to bring down a link automatically to the downstream ports (402 through 405 and 411) of the switch 401 and the root complex 400 when an uncorrectable error is detected. For example, it is assumed that a failure has occurred to the SSD 408 and a packet including the error is transmitted to the downstream port 404 of the switch 401. The downstream port 404 having detected the error brings down the link between the downstream port 404 and the SSD 408. As a result, the DPC enables to prevent all transaction packets following the error from transmitting to the upstream port or the downstream port of the switch 401, and to thereby enable prevention of the possibility of spreading of data damage.

The second function of the DPC is applied to execute removal without prior notification to the system, which is so-called async removal. For example, when async removal is executed to SSD 406, a link connecting a downstream port 402 and the SSD 406 transits from DL_Active to DL_Down. This transition causes surprise down error. Then, the surprise down error triggers DPC. The DPC hides the surprise down error from the system. As a result, the system is enabled to not handle the link down accompanying async removal of the SSD as a failure.

Figure 5:
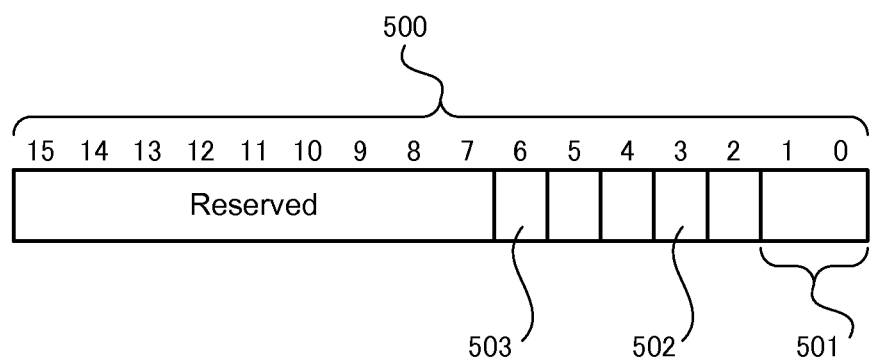
FIG. 5 is a view showing a DPC control register.

FIG. 5 is a view showing a DPC control register 500 equipped to a port of a switch capable of utilizing the DPC function disclosed in non-patent literature 3.

Bit 1 and bit 0 (501) of the DPC control register is a "DPC Trigger Enable field" for setting whether it is possible to trigger the DPC or not. By having this field set to "00", it becomes possible to invalidate the DPC function. By having this field set to "01" or "10", it becomes possible to validate the DPC function.

Bit 3 (502) of the DPC control register is a "DPC Interrupt Enable bit" for setting whether interrupt transmission by triggering the DPC is enabled or not. By setting this bit to "0", it becomes possible to invalidate the interrupt transmission by the DPC. By setting this bit to "1", it becomes possible to validate the interrupt transmission by the DPC.

Bit 6 (503) of the DPC control register is a "DPC Software Trigger bit" enabling triggering of the DPC via software. By setting this bit from "0" to "1", the software is capable of triggering DPC.

Figure 6:
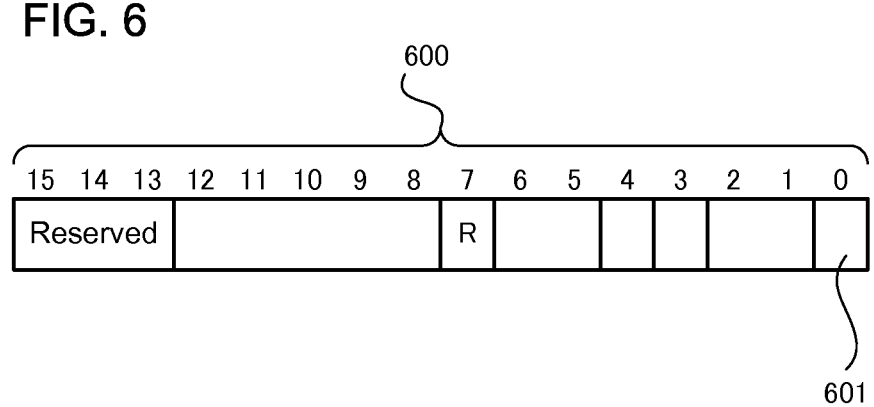
FIG. 6 is a view showing a DPC status register.

FIG. 6 is a view showing a DPC status register 600 equipped in a port of a switch capable of utilizing the DPC function described in non-patent literature 3.

Bit 0 (601) of the DPC status register is a "DPC Trigger Status bit" for displaying whether DPC is triggered or not. When this bit is set to "0", it shows that the DPC is not yet triggered, and when this bit is set to "1", it shows that the DPC is already triggered. If the DPC is already triggered, the DPC returns to normal operation by the software clearing this field.

Next, we will describe the configuration of a storage subsystem according to embodiment 1.

Figure 7:
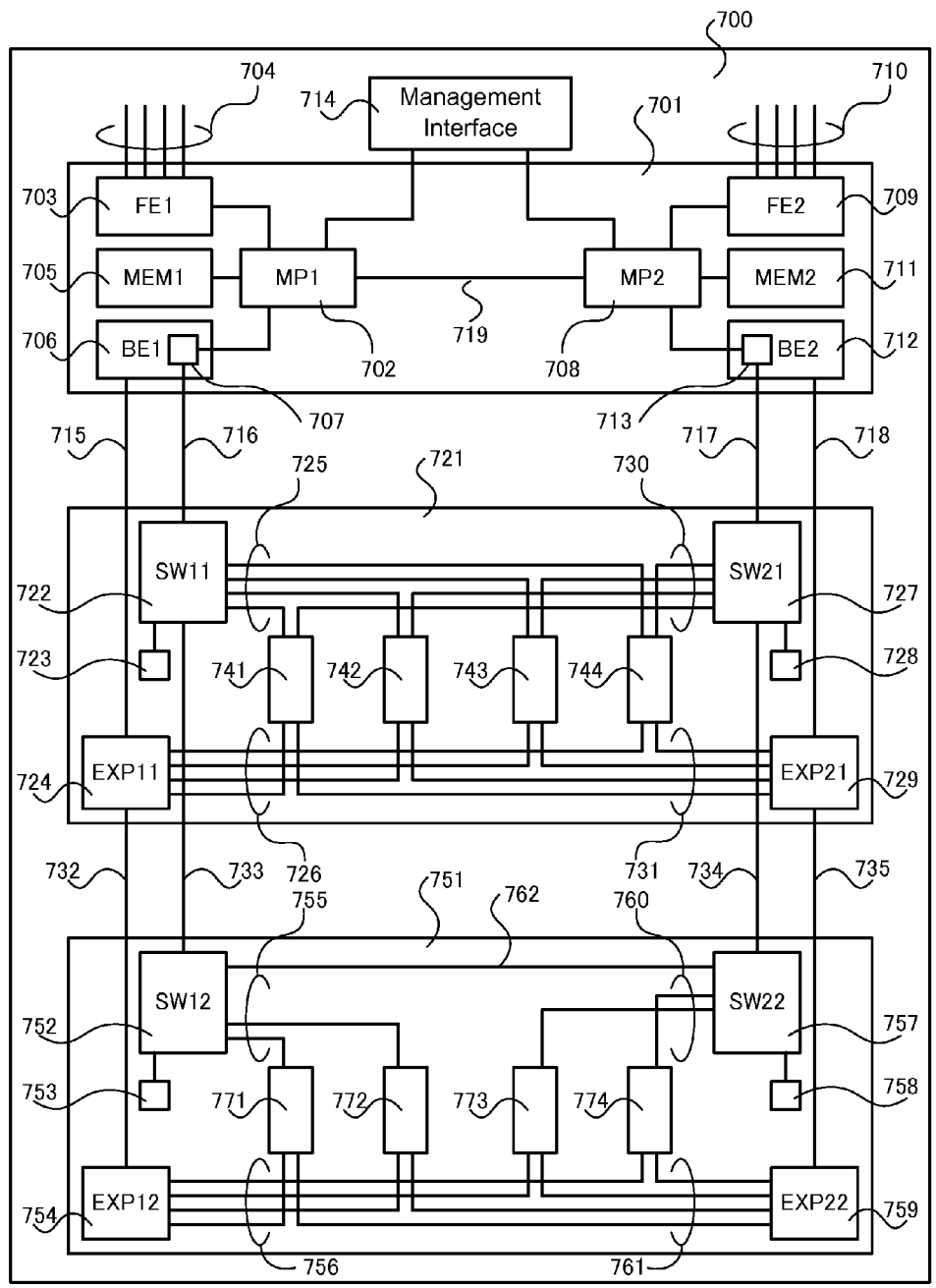
FIG. 7 is a view showing the configuration of a storage subsystem according to embodiment 1.

FIG. 7 is a view showing the configuration example of the storage subsystem.

A storage subsystem 700 is composed of a storage controller 701 and drive enclosures 721 and 751.

A storage controller 701 is composed of processors 702 and 708, front-end interfaces 703 and 709, memories 705 and 711, and back-end interfaces 706 and 712.

Front-end interfaces 703 and 709 connect to the host system (not shown) respectively via channels 704 and 710. Further, the front-end interfaces 703 and 709 convert the data transfer protocol between the host system and the storage controller 701 and the data transfer protocol within the storage controller 701.

Back-end interfaces 706 and 712 connect the storage controller 701 and the drive enclosure 721. Further, the back-end interface 706 and 712 convert the data transfer protocol within the storage controller 701, and the data transfer protocol between the storage controller 701 and drive enclosures 721 and 751.

Back-end interfaces 706 and 712 include SAS ports for connecting HDDs via an expander, and downstream ports 707 and 713 for connecting PCIe-SSDs.

Downstream ports 707 and 713 can be a portion of the switches disposed within the back-end interfaces 706 and 712 or can be a portion of the processors 702 and 708.

The memory 705 is a main memory of the processor 702, and stores programs executed by the processor 702 (such as a storage control program) or a management table and the like referred to by the processor 702.

The memory 711 is a main memory of the processor 708, and stores programs executed by the processor 708 (such as a storage control program) or a management table and the like referred to by the processor 708. Further, memories 705 and 711 can also be used as cache memories of the storage controller 701.

Processors 702 and 708 control data transfer between the host system connected via front-end interfaces 703 and 709 and HDDs or SSDs connected via back-end interfaces.

Processors 702 and 708 are connected via a signal line 719. Thereby, the processor 702 can access the memory 711, and the processor 708 can access the memory 705.

The management interface 714 has an input device for enabling an operator of the storage subsystem to enter setting information with respect to the storage controller 701. Further, the management interface 714 has a display device for displaying information of the storage subsystem to the operator of the storage subsystem.

The drive enclosure 721 has switches 722 and 727, expanders 724 and 729, enclosure control units 723 and 728, and connectors 741 through 744. Connectors 741 through 744 are capable of connecting SSDs or HDDs having dual ports. The switch 722 and the connectors 741 through 744 are connected via a signal line 725. The switch 727 and the connectors 741 through 744 are connected via a signal line 730. The expander 724 and the connectors 741 through 744 are connected via a signal line 726. The expander 729 and the connectors 741 through 744 are connected via a signal line 731.

The switches in the storage subsystem 700 support DPC in all the downstream ports.

Similar to drive enclosure 721, the drive enclosure 751 has switches 752 and 757, expanders 754 and 759, enclosure control units 753 and 758, and connectors 771 through 774. Connectors 771 through 774 are capable of connecting SSDs having a single port or HDDs having a dual port. The switch 752 and the connectors 771 and 772 are connected via a signal line 755. The switch 757 and the connectors 773 and 774 are connected via a signal line 760. The expander 754 and the connectors 771 through 774 are connected via a signal line 756. The expander 759 and the connectors 771 through 774 are connected via a signal line 761. Furthermore, the downstream port supporting the DPC of the switch 752 is connected to the downstream port supporting the DPC of the switch 757 via a signal line 762.

The downstream port 707 within the storage controller 701 and the switch 722 within the drive enclosure 721 are connected via a cable 716. The downstream port 713 within the storage controller 701 and the switch 727 within the drive enclosure 721 are connected via a cable 717. The back-end interface 706 within the storage controller 701 and the expander 724 within the drive enclosure 721 are connected via a cable 715. The back-end interface 712 within the storage controller 701 and the expander 729 within the drive enclosure 721 are connected via a cable 718.

The switch 722 within the drive enclosure 721 and the switch 752 within the drive enclosure 751 are connected via a cable 733. The switch 727 within the drive enclosure 721 and the switch 757 within the drive enclosure 751 are connected via a cable 734. The expander 724 within the drive enclosure 721 and the expander 754 within the drive enclosure 751 are connected via a cable 732. The expander 729 within the drive enclosure 721 and the expander 759 within the drive enclosure 751 are connected via a cable 735.

The storage subsystem 700 has two drive enclosures (721 and 751) in FIG. 7, but it is also possible to provide three or more drive enclosures. In that case, the drive enclosures are connected in a multistage manner by connecting the upstream of the switch within the drive enclosure being expanded to the downstream port of the switch within the existing drive enclosure. For example, the upstream port of the switch within the drive enclosure being expanded is connected via cables or the like to the downstream ports of switches 752 and 757 within the drive enclosure 751. The downstream port of the switch within the drive enclosure being expanded also supports DPC, similar to the switches within the existing drive enclosure. Moreover, the port of the expander within the drive enclosure being expanded is connected via cables or the like to the ports of expanders 754 and 759 within the drive enclosure 751. As described, drive enclosures are connected in a multistage manner so that the number of switch connecting stages from the storage controller 701 to the two switches disposed within the same drive enclosure are the same. The storage subsystem 700 can have only one or more drive enclosures 721, or only one or more drive enclosures 751. Further, the storage subsystem 700 can connect one or more drive enclosures 721 and 751 in arbitrary order to the storage controller 701.

Figure 8:
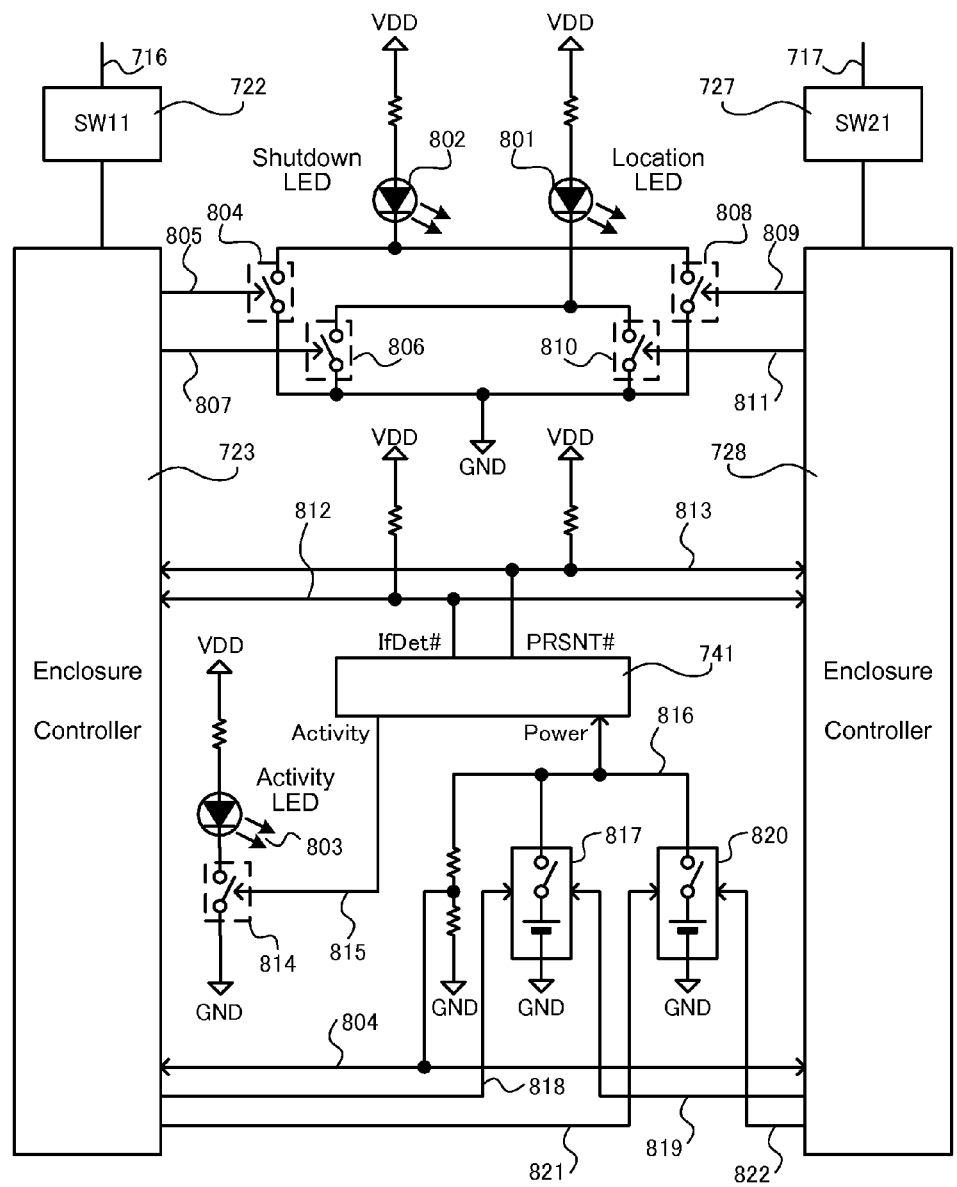
FIG. 8 is a view showing a connection of components within the drive enclosure according to embodiment 1.

FIG. 8 is a view showing the connection of components within a drive enclosure according to embodiment 1. FIG. 8 shows the connection between an enclosure control unit 723, LEDs 801 through 803, a connector 741 and power supply units 817 and 820, or the connection between an enclosure control unit 728, LEDs 801 through 803, a connector 741 and power supply units 817 and 820. For simplifying the description, the connection between the switch 722 and the connector 741, the connection between the switch 727 and the connector 741, and the signal connection for HDDs are not shown.

A shutdown LED 802 shows the state of power supply to a drive connected to the connector 741, as shown in FIG. 10.

The enclosure control unit 723 is connected to an LED drive circuit 804 via a signal line 805. The enclosure control unit 728 is connected to an LED drive circuit 808 via a signal line 809. The LED drive circuits 804 and 808 drive the shutdown LED 802 together. In other words, the storage controller 701 can control the turning on and off of the shutdown LED 802 via enclosure control units 723 or 728.

A location LED 801 shows whether a drive slot corresponding to the connector 741 is a target of operation or not. For example, when operation is required for multiple drives, the storage controller turns on the location LEDs 801 corresponding to each drive sequentially, based on which the operator operates the operation target drives sequentially.

The enclosure control unit 723 is connected to an LED drive circuit 806 via a signal line 807. The enclosure control unit 728 is connected to an LED drive circuit 810 via a signal line 811. The LED drive circuits 806 and 810 drive the location LED 801 together. In other words, the storage controller 701 can control the turning on and off of the location LED 801 via enclosure control units 723 or 728.

An IfDet# signal output from the connector 741 is entered via a signal line 812 subjected to pull-up to enclosure control units 723 and 728. A PRSNT# signal output from the connector 741 is entered via a signal line 813 subjected to pull-up to enclosure control units 723 and 728. The storage controller 701 can distinguish the drive type connected to the connector 741 as shown in FIG. 9 based on the IfDet# signal and the PRSNT# signal.

An activity LED 803 displays the status of activity of the drive connected to the connector 741.

An activity signal output from the connector 741 is entered via a signal line 815 to the LED drive circuit 814. The LED drive circuit 814 controls turning on and off of the activity LED 803 according to the entered activity signals.

The storage controller controls the output of power supply units 817 and 820 for each connector connecting the drive.

The power supply unit 817 is connected via a power supply line 816 to the connector 741, and supplies power to the drive connected to the connector 741. The storage controller 701 controls output of the power supply unit 817 via the enclosure control unit 723 and the signal line 818. Further, the storage controller 701 controls the output of the power supply unit 817 via the enclosure control unit 728 and the signal line 819.

The power supply unit 820 is connected via the power supply line 816 to the connector 741, and supplies power to the drive connected to the connector 741. The storage controller 701 controls output of the power supply unit 820 via the enclosure control unit 723 and the signal line 821. Further, the storage controller 701 controls the output of the power supply unit 820 via the enclosure control unit 728 and the signal line 822.

The output of the power supply units 817 and 820 is divided appropriately, and entered to the enclosure control units 723 and 728 via the signal line 804. The storage controller 701 can determine the status of output of the power supply units 817 and 820 according to the signals entered to the enclosure control units 723 and 728.

FIG. 9 is a view showing a method for identifying drives based on the disclosure of non-patent literature 1.

An HDD (SAS HDD) and an SSD (PCIe SSD) output a PRSNT# signal (904) and an IfDet# signal (905). Here, these signals are assumed to be pulled up, as shown in FIG. 8. When both the PRSNT# signal (904) and the IfDet# signal (905) are Low, the drive connected to the connector 741 is the HDD (901). When the PRSNT# signal (904) is High and the IfDet# signal (905) is Low, the driver connected to the connector 741 is the SSD (902). When both the PRSNT# signal (904) and the IfDet# signal (905) are High, there is no drive connected to the connector 741 (903).

FIG. 10 is a view showing the content of display of a shutdown LED according to embodiment 1.

The turn-on conditions of the shutdown LED differ according to the type of the drive inserted to the drive slot. When an HDD (SAS HDD) is inserted to the drive slot (1001), the shutdown LED is turned on when there is no power supply to the HDD (1003), and the shutdown LED is turned off when there is power supply to the HDD (1004).

When the SSD (PCIe SSD) is inserted to the drive slot (1002), the shutdown LED is turned on when the DPC is triggered in both of the ports of the switch connecting the dual port SSD (1003). When DPC is not triggered in any one of the ports of the switch connecting the dual port SSD, the shutdown LED is turned off (1004).

When there is no drive inserted to the drive slot, supply of power is stopped, and the DPC is triggered in the switch port. Therefore, in that case, the shutdown LED is turned on.

Figure 11:
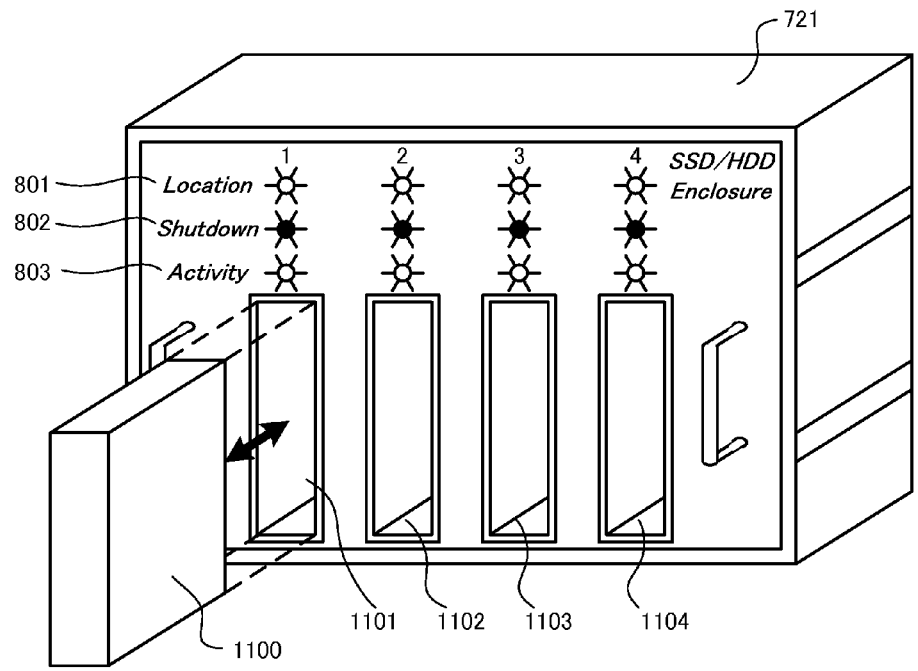
FIG. 11 is a view showing the drive enclosure according to embodiment 1 from the front side.

FIG. 11 is a view showing the drive enclosure according to embodiment 1 from the front side.

A drive enclosure 721 has drive slots 1101 through 1104 for inserting HDDs or SSDs (1100). Further, the drive enclosure 721 has locations LEDs 801, shutdown LEDs 802 and activity LEDs 803 respectively corresponding to drive slots 1101 through 1104. Based on the LED display, the operator can recognize the states of drives inserted to the respective drive slots.

Figure 12:
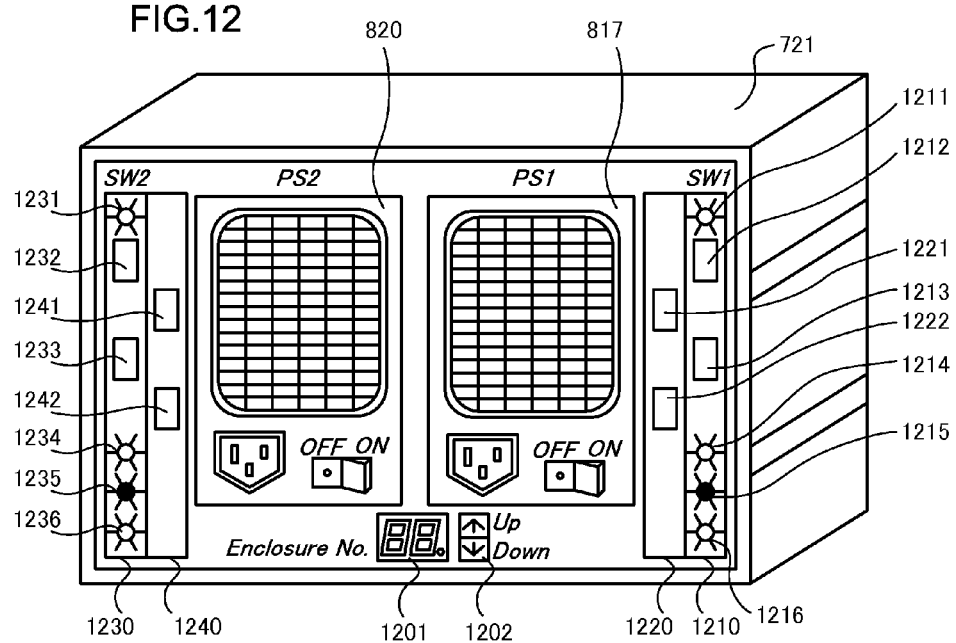
FIG. 12 is a view showing the drive enclosure according to embodiment 1 from the rear side.

FIG. 12 is a view showing the drive enclosure according to embodiment 1 from the rear side.

On the rear side of the drive enclosure 721 are arranged switch packages 1210 and 1230, expander packages 1220 and 1240, power supply units 817 and 820, an enclosure number display unit 1201 and an enclosure number setup unit 1202.

The enclosure number setup unit 1202 can set the enclosure number using push buttons, and the set enclosure number is displayed on an enclosure number display unit 1201. Further, the set enclosure number is stored in an upper section 1703 of a "Physical Slot Number field" of a register shown in FIG. 17.

A switch package 1210 has a switch 722, an enclosure control unit 723, a cable slot 1212 for connecting a cable 716, a cable slot 1213 for connecting a cable 733, and LEDs 1211 and 1214 through 1216. An LED 1211 is a switch LED for displaying whether DPC is triggered or not in the downstream port 707. An LED 1214 is a location LED for displaying whether the switch package 1210 is an operation target or not. An LED 1215 is a switch LED for showing whether DPC is triggered or not in the downstream port corresponding to a cable slot 1213. An LED 1216 is an activity LED for displaying a link status corresponding to a cable 733.

An expander package 1220 has an expander 724, a slot 1221 for connecting a cable 715, and a slot 1222 for connecting a cable 732.

A switch package 1230 has a switch 727, an enclosure control unit 728, a cable slot 1232 for connecting a cable 717, a cable slot 1233 for connecting a cable 734, and LEDs 1231 and 1234 through 1236. An LED 1231 is a switch LED for displaying whether DPC is triggered or not in the downstream port 713. An LED 1234 is a location LED for displaying whether the switch package 1230 is an operation target or not. An LED 1235 is a switch LED for displaying whether DPC is triggered or not in the downstream port corresponding to the cable slot 1233. An LED 1236 is an activity LED for displaying a link status corresponding to a cable 734.

The turning on and off of LEDs 1211 and 1214 through 1216 of the switch package 1210 and the LEDs 1231 and 1234 through 1236 of the switch package 1230 are controlled via the enclosure control unit by the storage controller 701, similar to LEDs 801 through 803 of FIG. 8.

Further, the switch LEDs (1211, 1215, 1231, 1235) can display whether link-down is performed in addition to displaying the DPC status of the switch ports corresponding to the respective LEDs. In other words, the storage controller 701 turns on the switch LED in a switch port where DPC is available, at the timing of link-down regardless of the DPC status.

In a switch package 1210, when the switch LED 1211 is turned on, the links are subjected to link-down in all the downstream ports of the switch 722 based on the PCIe base specification. In other words, the switch LED 1215 is also turned on. When both the switch LEDs 1211 and 1215 are turned on, the switch package 1210 can be removed from the drive enclosure 721.

Similarly, in a switch package 1230, when the switch LED 1231 is turned on, the links are subjected to link-down in all the downstream ports of the switch 727 based on the PCIe base specification. In other words, the switch LED 1235 is also turned on. When both the switch LEDs 1231 and 1235 are turned on, the switch package 1230 can be removed from the drive enclosure 721.

An expander package 1240 has an expander 729, a slot 1241 connecting the cable 718 and a slot 1242 connecting the cable 735.

Figure 13:
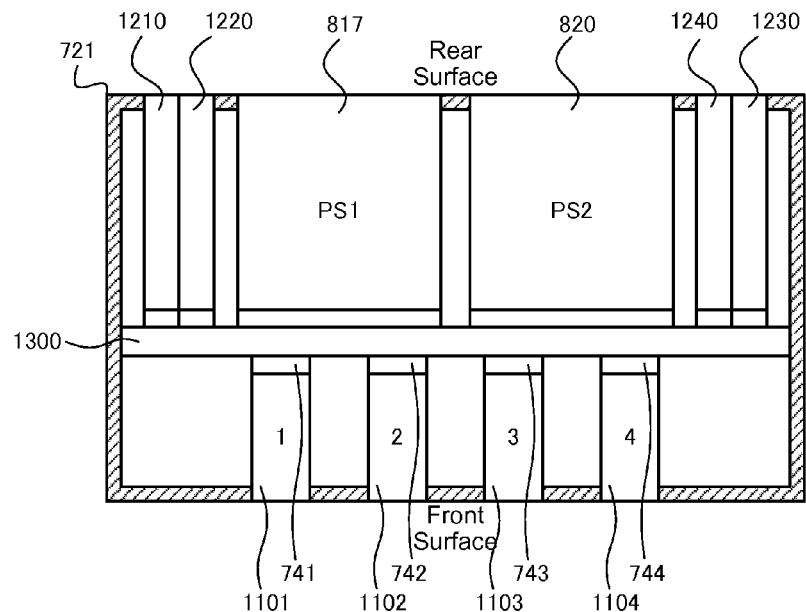
FIG. 13 is a view showing a cross-section of the drive enclosure from an upper side according to embodiment 1.

FIG. 13 is a view showing the drive enclosure according to embodiment 1 from the upper side.

A drive enclosure 721 has a mid plane 1300 which is a wiring board in the interior thereof. On the rear surface of the mid plane 1300 are connected switch packages 1210 and 1230, expander packages 1220 and 1240, and power supply units 817 and 820. The mid plane 1300 connects these components mutually. On the front surface of the mid plane 1300 are connected connectors 741 through 744. The HDDs or SSDs inserted to drive slots 1101 through 1104 are connected to components such the switch packages connected to the rear surface of the mid plane 1300 via connectors 741 through 744.

Figure 14:
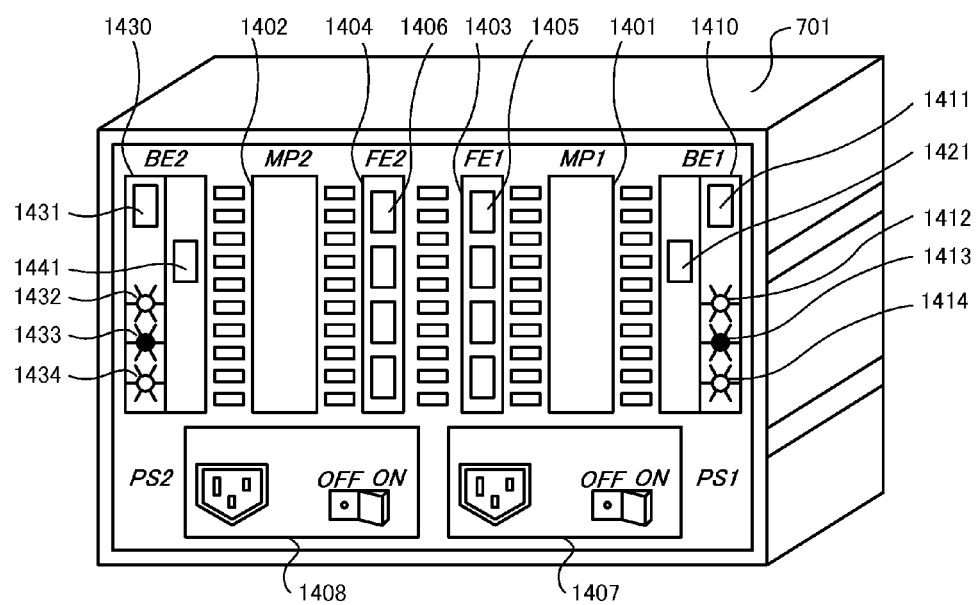
FIG. 14 is a view showing a storage controller unit according from embodiment 1 from the rear side.

FIG. 14 is a view showing the storage controller unit according to embodiment 1 from the rear side.

On the rear side of the storage controller 701 are arranged backend packages 1410 and 1430, processor packages 1401 and 1402, frontend packages 1403 and 1404, and power supply units 1407 and 1408.

A processor package 1401 has a processor 702 and a memory 705. A processor package 1402 has a processor 708 and a memory 711.

A frontend package 1403 has a front-end interface 703 and a slot 1405 for connecting to the host system via a cable. A frontend package 1404 has a front-end interface 709 and a slot 1406 for connecting to the host system via a cable.

A backend package 1410 has a back-end interface 706, a downstream port 707, a cable slot 1411 for connecting a cable 716, a slot 1421 for connecting a cable 715, and LEDs 1412 through 1414. An LED 1412 is a location LED for showing whether the backend package 1410 is an operation target or not. An LED 1413 is a switch LED for displaying whether DPC is triggered or not in the downstream port (707) corresponding to the slot 1411. An LED 1414 is an activity LED for displaying the link status corresponding to the cable 716.

A backend package 1430 has a back-end interface 712, a downstream port 713, a cable slot 1431 for connecting a cable 717, a slot 1441 for connecting a cable 718, and LEDs 1432 through 1434. An LED 1432 is a location LED for displaying whether the backend package 1430 is an operation target or not. An LED 1433 is a switch LED for displaying whether DPC is triggered or not in the downstream port (713) corresponding to the slot 1431. An LED 1434 is an activity LED for displaying the link status corresponding to the cable 717.

FIG. 15 is a view showing a drive management table 1500 according to embodiment 1.

A drive management table 1500 is stored in two locations, a memory 705 and a memory 711 within the storage controller 701. A processor 702 refers to the drive management table 1500 within the memory 705, and a processor 708 refers to the drive management table 1500 within the memory 711.

The drive management table 1500 stores a logical slot number 1501, a logical drive number 1502, a drive (media) type information 1503, a port 1 identification information 1504, a port 2 identification information 1505 and a drive identification information 1506.

The logical slot number 1501 is identification information of a drive slot used by processors 702 and 708.

The logical drive number 1502 is identification information of an HDD or an SSD used by the processors 702 and 708.

The drive (media) type 1503 is information showing whether the drive (media) inserted in the drive slot is an HDD or an SSD, or whether no drive is inserted thereto.

The port 1 identification information 1504 and the port 2 identification information 1505 are physical slot numbers of a switch port (target switch port) connecting the SSD when the drive type is SSD. Further, the port 1 identification information 1504 and the port 2 identification information 1505 are port IDs of HDDs when the drive (media) type is HDD. By using the port 1 identification information 1504 and the port 2 identification information 1505, the storage controller 701 can determine whether two drive ports belong to a same drive or not.

The drive identification information 1506 is an EUI64 (IEEE Extended Unique Identifier) of a name space when the drive (media) type is SSD, and it is a World-Wide Name of a logical unit when the drive (media) type is HDD. By using the drive identification information 1506, the storage controller 701 can identify a specific drive even when the drives are replaced between different slots.

FIG. 16 is a view showing a drive slot management table 1600 according to embodiment 1.

The drive slot management table 1600 is stored in two locations, a memory 705 and a memory 711 within the storage controller 701. The processor 702 refers to the drive slot management table 1600 within memory 705, and the processor 708 refers to the drive slot management table 1600 within memory 711.

A logical slot number 1601 is identification information of a drive slot used by processors 702 and 708, similar to 1501 of FIG. 15.

A DPC status 1602 is a two-bit information, wherein both bits refer to whether DPC is triggered or not, wherein the lower bit shows the status of a switch port accessible from a processor 702 side for connecting the port of a removal target SSD, and the upper bit shows the status of a switch port accessible from a processor 708 side for connecting the port of a removal target SSD.

If a hot remove control information 1603 is "ON", an interrupt handler operates as a portion of a normal SSD removal procedure. If the information 1603 is "OFF", an interrupt handler operates as a portion of failure processing.

A shutdown LED control information 1604 controls the turning on and off of shutdown LED, and also shows the current status of the shutdown LED.

A location LED control information 1605 controls the turning on and off of location LED, and also shows the current status of the location LED.

Figures 17, 18:
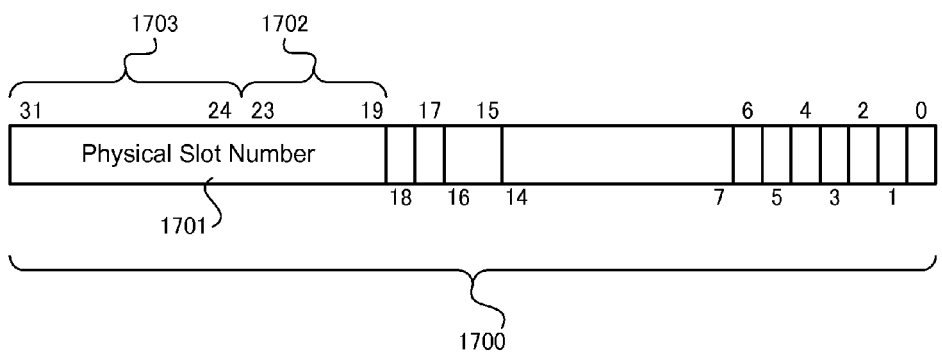
FIG. 17 is a view showing a slot capability register.
FIG. 18 is a view showing a cable slot management table according to embodiment 1.

FIG. 17 is a view showing switch slot capabilities register (1700) determined in the PCIe base specification.

A "Physical Slot Number field" (1701) of the slot capability register (1700) stores information set during initialization of the switch. For example, identification information of a drive enclosure is stored in the upper section 1703 of this field. Then, a slot identification information within the drive enclosure is stored in a lower section 1702 of the field. The software is capable of using the information stored in this field as slot identification information.

FIG. 18 is a view showing a cable slot management table 1800 according to embodiment 1.

The cable slot management table 1800 is stored in two locations, in a memory 705 and a memory 711 within the storage controller 701. The processor 702 refers to the cable slot management table 1800 within the memory 705, and the processor 708 refers to the cable slot management table 1800 within the memory 711.

A logical slot number 1801 is identification information of the cable slot used by processors 702 and 708.

A physical slot number 1802 stores the value of physical slot number (1701) of FIG. 17.

A back-end interface information 1803 shows whether the cable slot is used on the processor 702 side or the processor 708 side. When the cable slot is used by the processor 702 side, "1" is entered thereto, and when it is used by the processor 708 side, "2" is entered thereto.

A DPC status 1804 shows whether DPC is triggered or not in a switch port connected to the upstream side of the target cable. When the DPC is not triggered, "0" is entered thereto, and when the DPC is already triggered, "1" is entered thereto.

If "ON" is entered to a hot remove control information 1805, an interrupt handler is activated as a part of a normal cable removal process. If "OFF" is entered thereto, the interrupt handler is activated as a part of a failure processing.

A shutdown LED control information 1806 controls turning on or off of the shutdown LED, and shows the current status of the shutdown LED.

A location LED control information 1807 controls turning on or off of the location LED, and shows the current status of the location LED.

<Description of Removal Flow>

Next, we will describe a method for removing SSD according to embodiment 1 of the present invention.

At first, an outline of the flow for removing an SSD from a drive slot will be described.

1) Stop I/O operation regarding target SSD.
2) Set operation of interrupt handler to removal.
3) DPC is triggered by software in target switch port.
4) LED provided corresponding to target drive slot shows a state where the preparation of the removal of the SSD has been completed.

Figure 1:
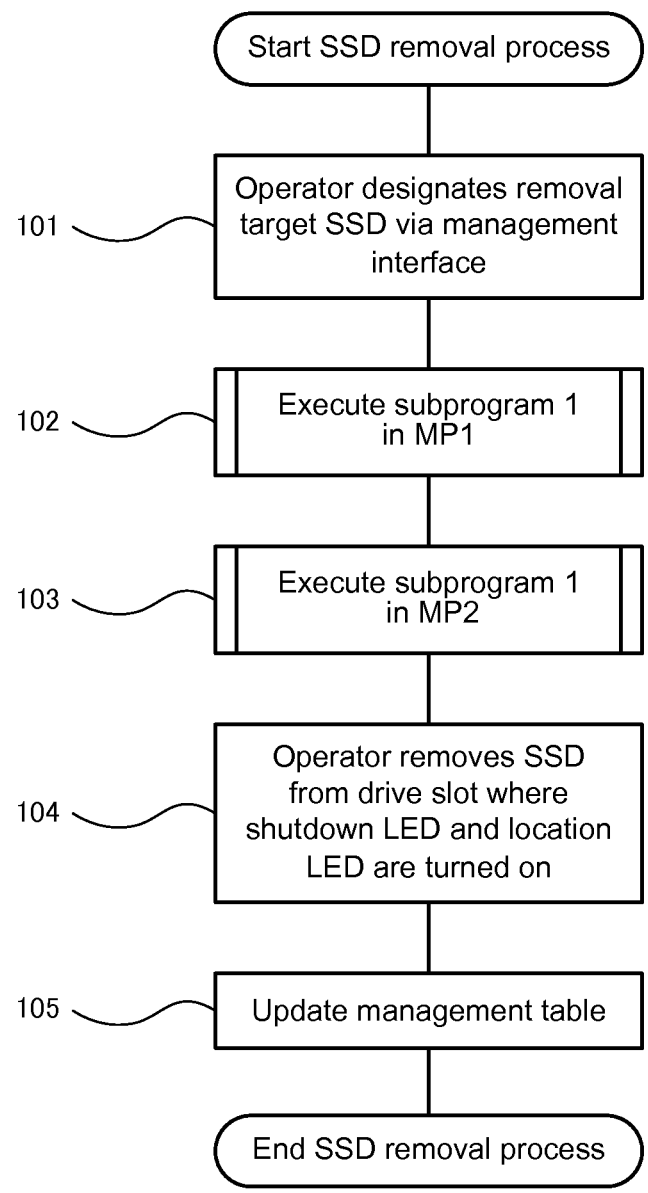
FIG. 1 is a flowchart of SSD removal according to embodiment 1.

FIG. 1 is a flowchart of SSD removal according to embodiment 1 of the present invention.

In step 101, an operator of a storage subsystem 700 designates a target SSD to the storage controller 701 via the management interface 714. The storage controller 701 turns on the location LED corresponding to the target drive slot.

In step 102, the storage controller 701 executes a subprogram 1 by the processor 702. Here, the flowchart of subprogram 1 and the flowchart of the interrupt handler executed within the subprogram 1 are described first, and then the description returns to the flowchart of FIG. 1.

Figure 2:
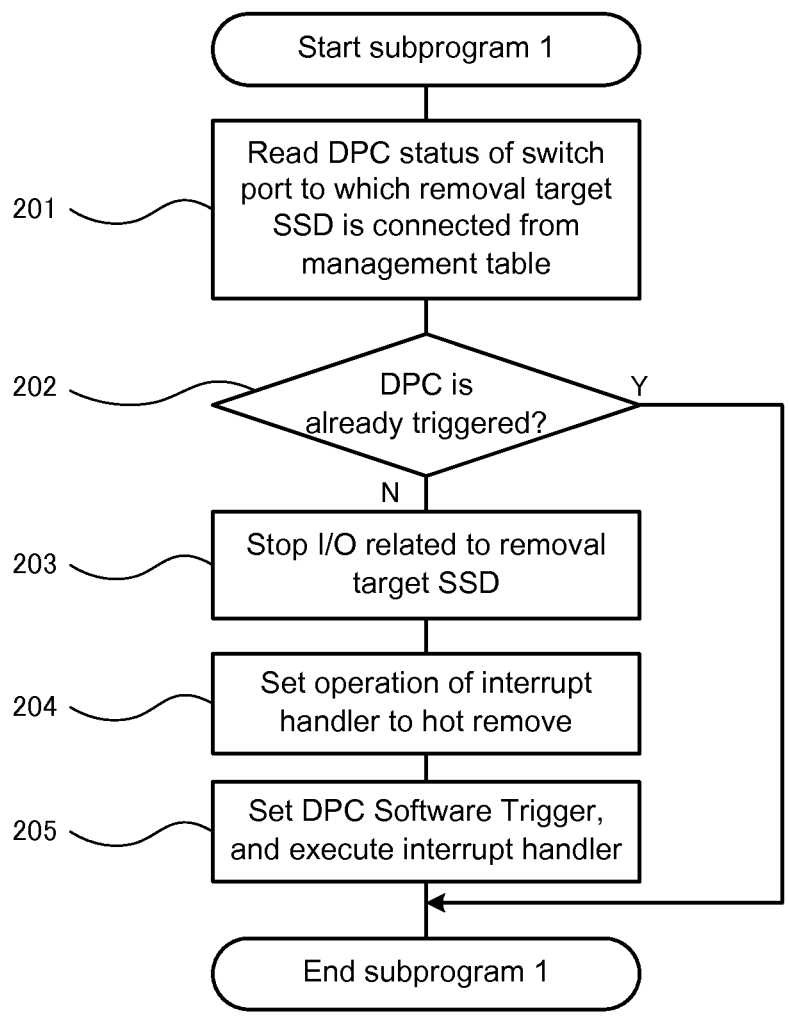
FIG. 2 is a flowchart of the subprogram executed within the flow of SSD removal according to embodiment 1.

FIG. 2 is a flowchart of subprogram 1 executed within the flow of FIG. 1.

In step 201, the subprogram 1 reads an entry of a DPC status 1602 of the switch port to which the removal target SSD is connected from the management table 1600.

In step 202, if DPC is not yet triggered in a target switch port accessible from a processor 702 in which the subprogram 1 is executed (N), the subprogram 1 advances to step 203, and if DPC is already triggered (Y), the subprogram 1 is ended.

If DPC is not yet triggered (N), in step 203, the subprogram 1 stops the I/O related to the target SSD.

In step 204, the subprogram 1 sets the operation of the interrupt handler to "hot remove". In other words, in the management table 1600, the entry of the hot remove control 1603 corresponding to the target drive slot is turned from "OFF" to "ON".

In step 205, the subprogram 1 sets a "DPC Software Trigger bit" of the target switch port accessible from the processor 702 in which the subprogram 1 is executed. As a result, the DPC is triggered, and interrupt is transmitted from the switch to the processor 702. The processor 702 having received the interrupt executes an interrupt handler.

Then, the subprogram 1 is ended.

Figure 3:
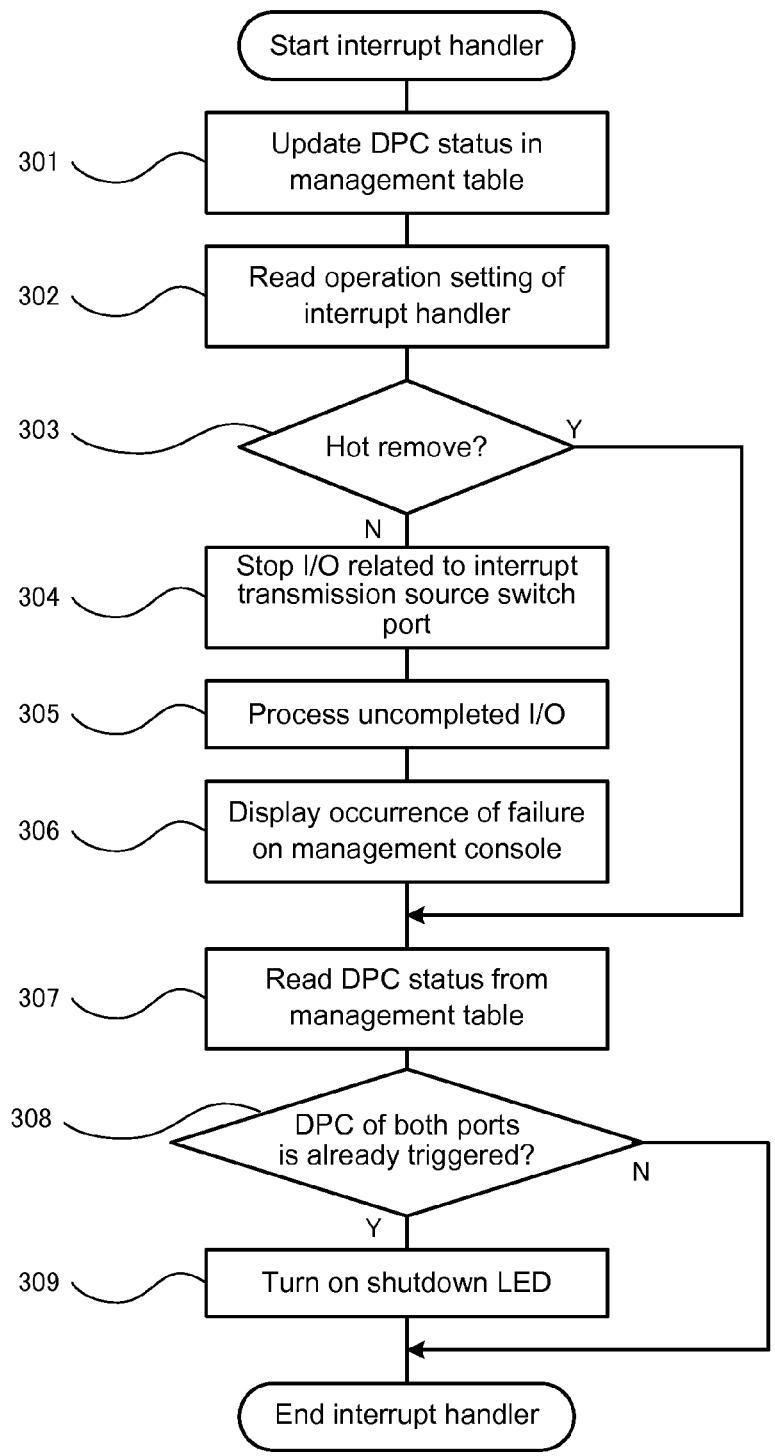
FIG. 3 is a flowchart of interrupt handler triggered within the flow of SSD removal according to embodiment 1.

FIG. 3 is a flowchart of an interrupt handler.

In step 301, the interrupt handler updates a DPC status 1602 of a target switch port in the drive slot management table 1600. When the processor 702 is executing the interrupt handler, the lower bit of the DPC status is set to "1". Further, when the processor 708 is executing the interrupt handler, the upper bit of the DPC status is set to "1".

In step 302, the interrupt handler reads the entry of the hot remove control 1603 corresponding to the target drive slot from the drive slot management table 1600.

In step 303, if the result of read is "ON (hot remove)" (Y), the procedure advances to step 307. If the result of read is "OFF (not hot remove)" (N), the procedure advances to step 304.

Steps 304 to 306 show the case where DPC is triggered without prior notification to the storage controller 701, that is, the process when failure occurs.

In step 304, the interrupt handler causes to stop the issuing of a new I/O regarding the interrupt transmission source switch port.

In step 305, the interrupt handler causes to abort the outstanding I/O processing regarding the interrupt transmission source switch port.

In step 306, the interrupt handler displays on the management interface 714 that failure has been detected in the interrupt transmission source switch port.

In step 307, the interrupt handler reads the DPC status 1602 of the target switch port from the drive slot management table 1600.

If the SSD is a dual port SSD, it means that there are two target switch ports.

In step 308, the interrupt handler determines whether both of the two target switch ports have already triggered DPC or not. That is, if the read DPC status is "3" (the two bits are "1" and "1") (Y), the procedure advances to step 309, and in other cases (N), the interrupt handler is ended.

In step 309, the interrupt handler turns on the shutdown LED corresponding to the target drive slot.

Thus, the interrupt handler is ended.

Next, the description will return to the flowchart of FIG. 1.

In step 103, the storage controller 701 executes the subprogram 1 by the processor 708. The contents of subprogram 1 are as described earlier, so the description thereof is omitted.

In step 104, the operator removes the target SSD from the drive slot where the location LED and the shutdown LED are turned on.

In step 105, the storage controller 701 deletes an entry related to the target SSD from the drive management table 1500 and the drive slot management table 1600.

Further, the storage controller 701 turns off the location LED corresponding to the target drive slot.

Now, the removal of the SSD according to embodiment 1 is completed.

<Effect of Embodiment 1>

Figure 19:
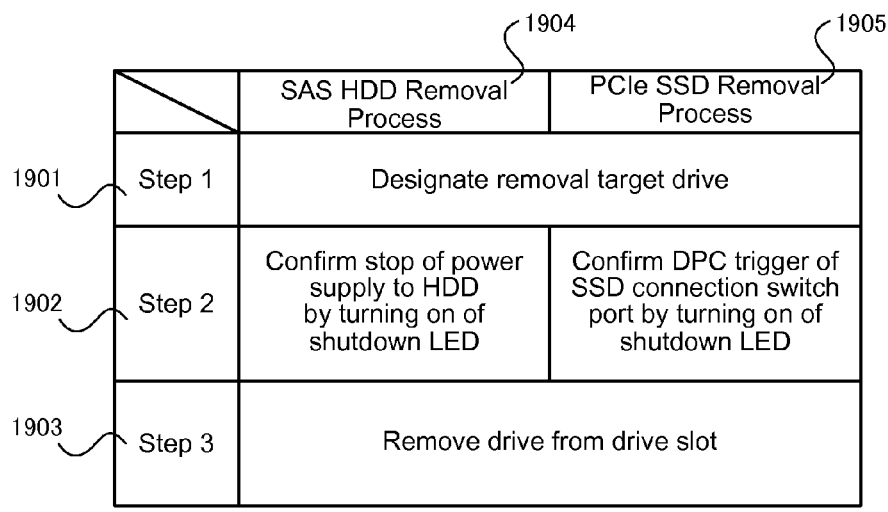
FIG. 19 is a view showing a drive removal process seen from an operator according to embodiment 1.

FIG. 19 is a view showing a drive removal procedure seen from the operator according to embodiment 1.

At first, a procedure for removing an HDD from the drive enclosure slot (1904) will be described.

In the first step (1901), the operator uses the management interface 714 to designate the target HDD to the storage controller 701.

The storage controller 701 having received the designation stops power supply to the target HDD in the drive slot (target drive slot) inserted to the target HDD. As a result, the shutdown LED corresponding to the target drive slot is turned on.

In the second step (1902), the operator can confirm the stopping of power supply to the target HDD based on the turned on status of the shutdown LED in the target drive slot.

In the third step (1903), the operator removes the target HDD from the target drive slot.

Next, the step for removing the SSD from the slot of the drive enclosure (1905) will be described.

In the first step (1901), the operator uses the management interface 714 to designate the target SSD to the storage controller 701.

The storage controller 701 having received the designation triggers the DPC in the two switch ports (target switch ports) connecting the target SSD. As a result, the shutdown LED corresponding to the drive slot to which the target SSD is inserted (target drive slot) is turned on.

In the second step (1902), the operator can confirm the DPC trigger status in the target switch port of the target SSD by the turning on of the shutdown LED in the target drive slot.

In the third step (1903), the operator removes the target SSD from the target drive slot.

As described, according to embodiment 1, the operator can remove the HDD and the SSD via similar procedures from the slot of the drive enclosure, regardless of the drive type.

Whether to stop power feed to the SSD or not when removing the SSD is optional. In addition to the DPC trigger operation in the target switch port, it is possible to stop the power feed to the SSD before turning on the shutdown LED. In another example, power feed can be stopped after the SSD is removed from the target drive slot.

<Description of Prior Art not Adopting Embodiment 1>

Figure 33:
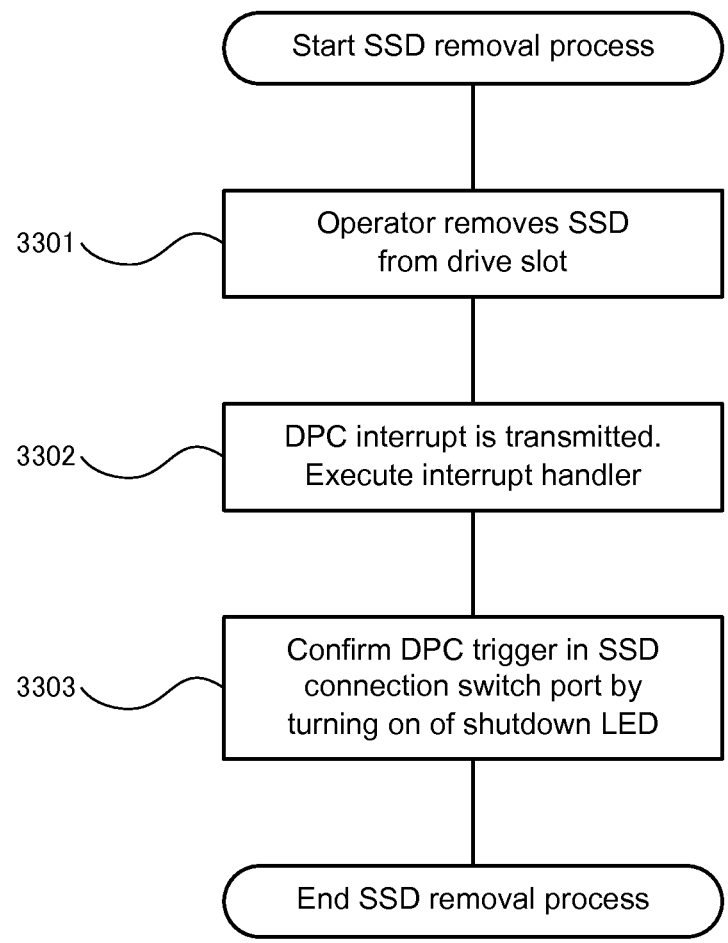
FIG. 33 is a flowchart of removal of SSD according to a prior art.
Figure 34:
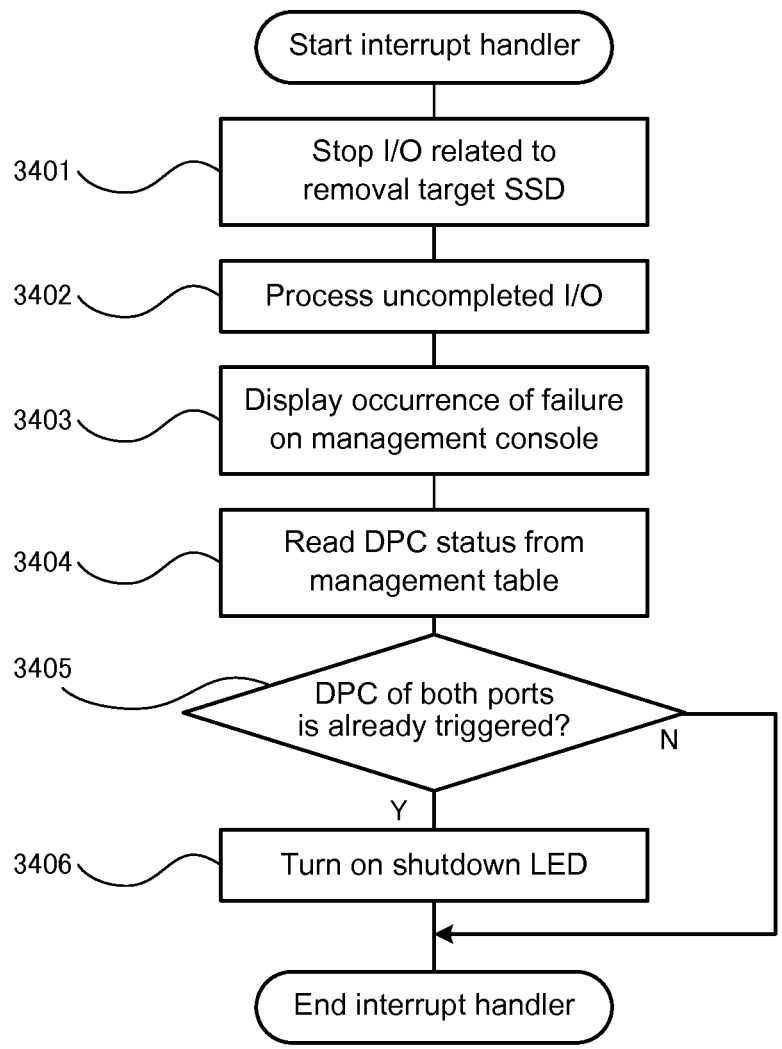
FIG. 34 is a flowchart of an interrupt handler triggered within the flow of removing the SSD according to the prior art.

FIGS. 33 and 34 are views describing the method for removing SSD according to the prior art, without adopting the method described in embodiment 1.

The device configuration for performing removal is similar to embodiment 1 described with reference to FIGS. 7, 8 and the like, but the method differs from the removal method of embodiment 1 in that the I/O related to the removal target SSD is not stopped prior to removal and that the operation of the interrupt handler accompanying removal is not changed.

FIG. 33 is a flowchart of an SSD removal according to the prior art.

In step 3301, the operator of the storage subsystem removes the target SSD from the target drive slot without prior notification to the storage controller 701. In other words, async removal is performed.

In step 3302, as a result of async removal of the target SSD, the DPC is triggered in the target switch port, and interrupt is transmitted to the processors 702 and 708. The processors 702 and 708 having received the interrupt execute the interrupt handler.

Next, we will describe the flowchart of the interrupt handler, before returning to the flowchart of FIG. 33 again.

FIG. 34 is a flowchart of an interrupt handler triggered within the SSD removal flow according to the prior art.

In step 3401, the storage controller 701 stops issuing of the new I/O regarding the target SSD.

In step 3402, the storage controller 701 aborts the outstanding I/O regarding the target SSD.

In step 3403, the storage controller 701 displays occurrence of failure in the target SSD to the management interface 714.

In step 3404, the storage controller 701 reads the DPC status of the target switch port from the drive slot management table 1600, and checks the DPC trigger status.

In step 3405, when the DPC is already triggered in two target switch ports (Y), the procedure advances to step 3406. In other cases (N), the interrupt handler is ended.

In step 3406, the storage controller 701 turns on the shutdown LED corresponding to the target drive slot.

Thus, the interrupt handler of FIG. 34 is ended.

We will now return to the description of the flowchart of FIG. 33.

In step 3303, the operator confirms DPC trigger in the target switch port by the turning on of the shutdown LED.

Thus, the SSD removal according to the prior art is ended.

As described above, according to the prior art method for removing the SSD, the SSD removal must be handled as failure. With respect thereto, the method for removing SSD according to embodiment 1 does not require failure processing to be performed, and the SSD can be removed safely. Further, the load on the processors 702 and 708 accompanying SSD removal can be reduced.

Embodiment 2

Now, the method for attaching the SSD according to embodiment 2 will be described with reference to FIGS. 20 to 22.

At first, in embodiment 2, the outline of the flow for attaching the SSD will be shown.

1) After inserting an SSD to a drive slot, at first, the "DPC Trigger Enable" of the switch port corresponding to the attach destination drive slot is invalidated.

2) The "DPC Trigger Status" of the switch port is cleared.

3) The LED provided in correspondence to the drive slot shows an SSD removal impossible state.

Incidentally, in the description of embodiment 2, the SSD or HDD to be inserted to the drive slot are respectively called "target SSD" and "target HDD". Further, the drive slot to which the target SSD or the target HDD is inserted is called a "target drive slot".

Figure 20:
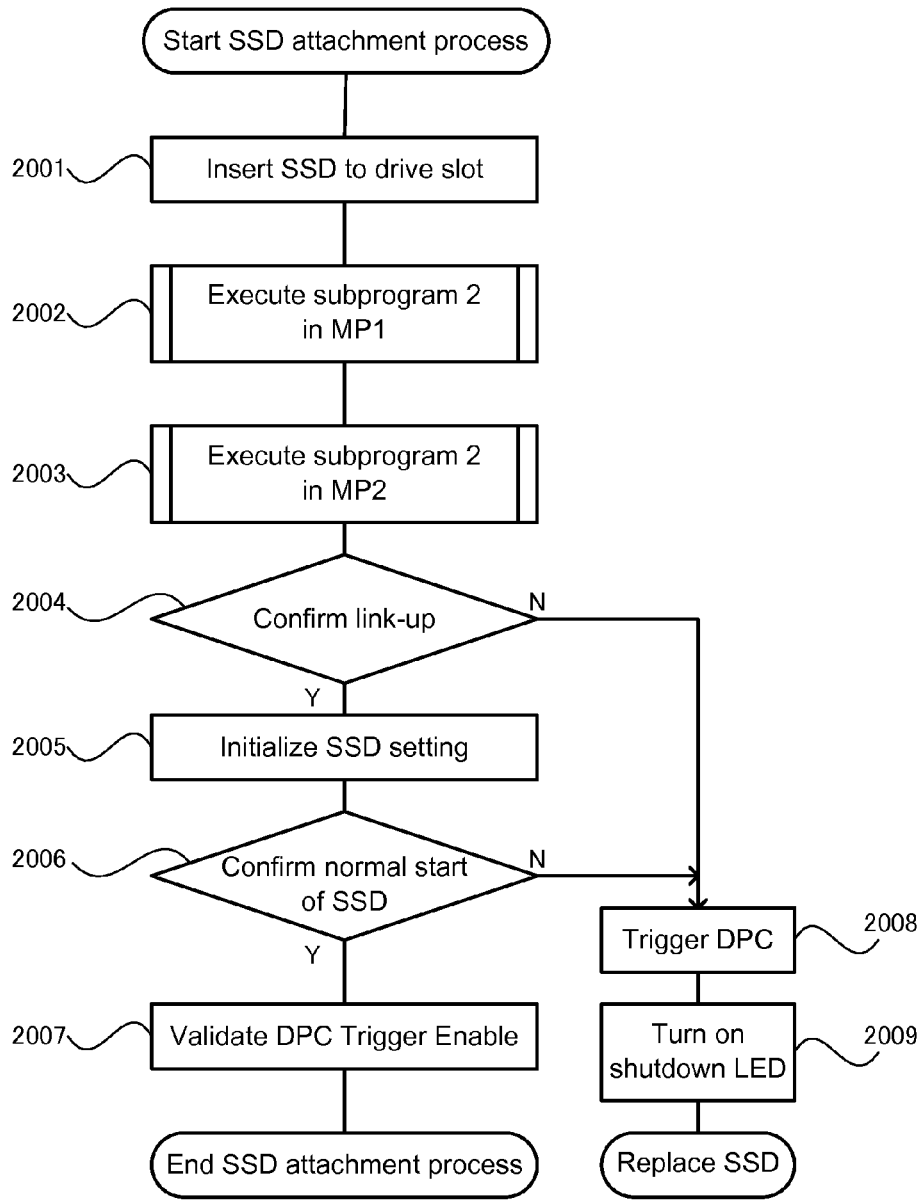
FIG. 20 is a flowchart of attachment of SSD according to embodiment 2.

FIG. 20 is a flowchart of the SSD attachment according to embodiment 2.

In step 2001, the operator of the storage subsystem inserts a target SSD in a vacant slot (target drive slot). The storage controller 701 detects insertion of the SSD via the enclosure control unit.

In step 2002, the storage controller 701 executes a subprogram 2 by the processor 702. Here, the flowchart of subprogram 2 will be described first, before returning to the flowchart of FIG. 20.

Figure 21:
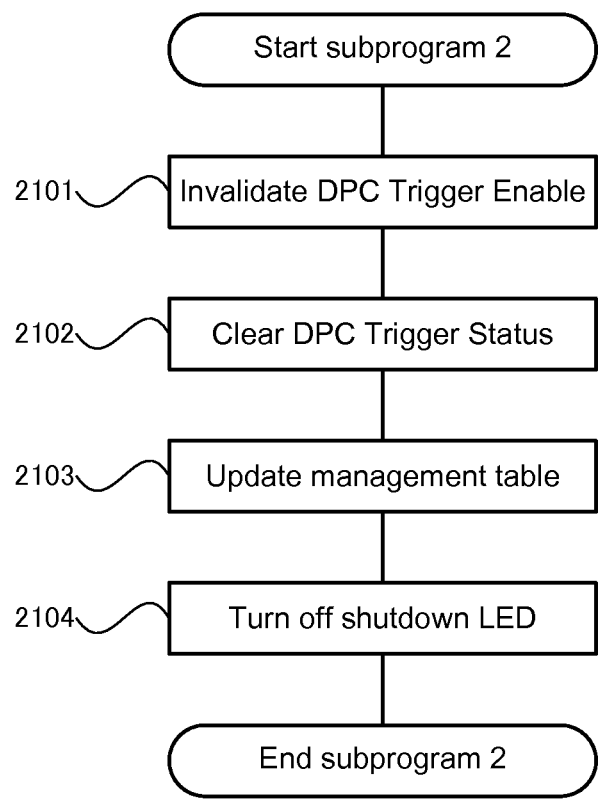
FIG. 21 is a flowchart of a subprogram executed within the flow of attachment of SSD according to embodiment 2.

FIG. 21 is a flowchart of the subprogram 2 executed within the SSD attachment flow according to embodiment 2.

In step 2101, the subprogram 2 invalidates "DPC Trigger Enable" in the target switch port accessible from the processor 702 executing the subprogram 2. In the target switch port set as described above, DPC cannot be triggered.

In step 2102, the subprogram 2 clears the "DPC Trigger Status" in the target switch port accessible from the processor 702 executing the subprogram 2. As a result, if the target SSD is normal, the target switch port accessible from the processor executing the subprogram 2 and the target SSD will be subjected to link-up.

In step 2103, the subprogram 2 adds an entry related to the target SSD to the drive management table 1500 and the drive slot management table 1600.

In step 2104, the subprogram 2 controls the LED drive circuit 804 or 808 so as to turn off the shutdown LED corresponding to the target drive slot. The shutdown LED is actually turned off when both the LED drive circuits 804 and 808 are turned off.

We will return to the description of the flowchart of FIG. 20.

In step 2003, the storage controller 701 executes the subprogram 2 by the processor 708. Here, the shutdown LED corresponding to the target drive slot will be turned off. Further, if the target SSD is normal, the target SSD starts operation.

In step 2004, the storage controller 701 confirms whether the two target switch ports and target SSD are subjected to link-up or not. If the two links connected to the two target switch ports are both subjected to link-up (Y), the procedure advances to step 2005. Otherwise (N), the procedure advances to step 2008.

In step 2005, the storage controller 701 sets up the configuration register and the like of the target SSD.

In step 2006, the storage controller 701 confirms whether the target SSD is started normally or not. Normal start is confirmed for example by reading a specific status of the configuration register of the target SSD.

Next, during normal start (Y), in step 2007, the storage controller 701 validates the "DPC Trigger Enable" in the two target switch ports. Thereafter, when error is detected in the target switch port, the DPC will be triggered.

Steps 2008 and 2009 are a process executed when there is an initial failure or the like in the target SSD and normal start of target SSD fails (N).

In step 2008, the storage controller 701 triggers the DPC in the two target switch ports.

In step 2009, the storage controller 701 turns on the shutdown LED and the location LED corresponding to the target drive slot. Further, the storage controller 701 displays that there is a failure in the target SSD on the management interface 714.

Then, the operator removes the target SSD from the drive slot where the shutdown LED and the location LED are turned on, and replaces the same with a new SSD.

FIG. 22 is a view showing a drive attachment procedure performed by the operator according to embodiment 2.

At first, the process of attaching an HDD to a drive slot of the drive enclosure (2204) will be described.

In the first step (2201), the operator inserts the target HDD to the vacant slot (target drive slot).

The storage controller 701 detects insertion of the HDD via the enclosure control unit. Then, the storage controller 701 starts feeding of power to the HDD in the target drive slot. As a result, the shutdown LED corresponding to the target drive slot is turned off.

In the second step (2202), the operator can confirm that power supply to the target HDD has been started by the turning off of the shutdown LED corresponding to the target drive slot.

In the third step (2203), the operator can confirm the starting of operation of the HDD by starting the blinking of the activity LED corresponding to the target drive slot.

Next, the process of attaching an SSD to the drive slot of the drive enclosure (2205) will be described.

In the first step (2201), the operator inserts a target SSD to the vacant slot (target drive slot).

The storage controller 701 detects insertion of the SSD via the enclosure control unit. If power supply has been stopped in the target drive slot, the storage controller 701 starts supplying power to the power supply 817 or 820. Then, the storage controller 701 cancels the DPC in the two target switch ports (clears the "DPC Trigger Status"). As a result, the shutdown LED corresponding to the target drive slot has been turned off.

In the second step (2202), the operator confirms cancelling of the DPC corresponding to the target switch port of the target SSD by the turning off of the shutdown LED corresponding to the target drive slot.

In the third step (2203), the operator can confirm the starting of operation of the SSD by the blinking of the activity LED corresponding to the target drive slot.

As described, according to embodiment 2, the operator can attach an HDD and an SSD via the same procedure to the drive slot of the drive enclosure regardless of the drive type.

Embodiment 3

Now, the method for removing an SSD according to embodiment 3 of the present invention will be described with reference to FIGS. 23 through 25.

At first, the outline of the flow of removing the SSD from the drive slot according to embodiment 3 will be described.

1) The I/O operation related to the target SSD is stopped.
2) The operation of the interrupt handler is set to removal.
3) The LED provided in correspondence to the target drive slot shows a state where removal preparation of the target SSD is complete.
4) The DPC is triggered in the target switch port by removing the target SSD from the target drive slot.
5) The LED provided in correspondence to the target drive slot shows a state where the removal of the SSD has been completed.

Figure 23:
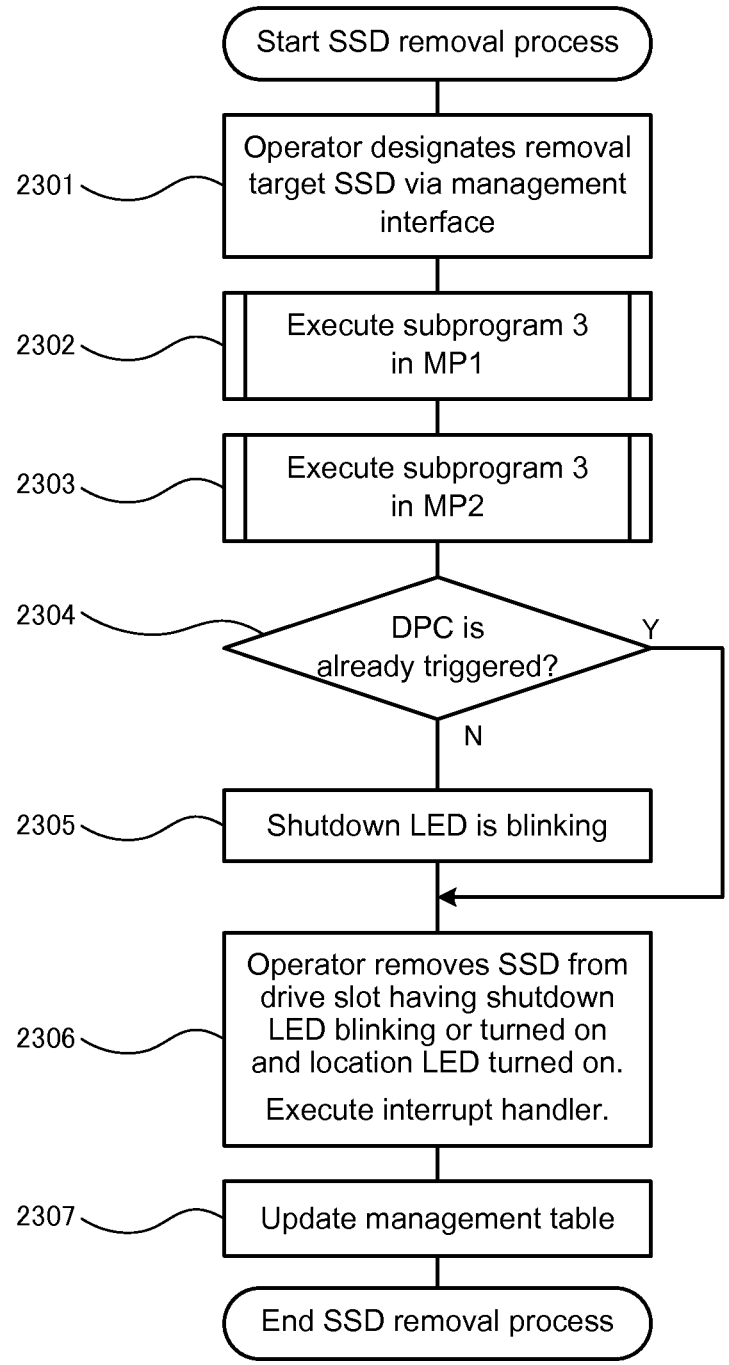
FIG. 23 is a flowchart of removing the SSD according to embodiment 3.

FIG. 23 is a flowchart of the SSD removal process according to embodiment 3.

In step 2301, the operator of the storage subsystem 700 designates the target SSD to the storage controller 701 via the management interface 714. The storage controller 701 turns on the location LED corresponding to the target drive slot.

In step 2302, the storage controller 701 executes a subprogram 3 by the processor 702. Now, the flowchart of subprogram 3 and the flowchart of the interrupt handler executed within the subprogram 3 are explained, before returning to the explanation of the flowchart of FIG. 23.

Figure 24:
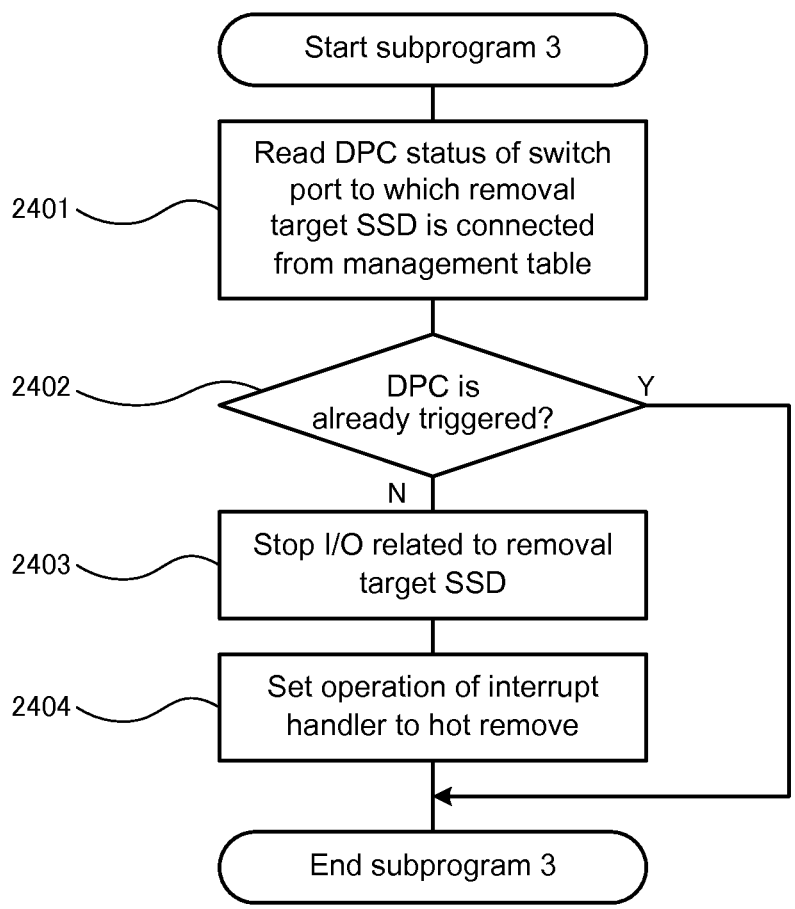
FIG. 24 is a flowchart of the subprogram executing in the flow of the SSD removal according to embodiment 3.

FIG. 24 is a flowchart of the subprogram 3 executed during the flow of FIG. 23.

The flowchart of FIG. 24 is similar to the flowchart of FIG. 2 except that step 205 is removed. In other words, the subprogram 3 does not set the "DPC Software Trigger bit" of the target switch port. In other words, according to embodiment 3, the triggering of DPC via software is not performed. The other steps of the flowchart of subprogram 3 are the same as that of subprogram 1, so the descriptions thereof are omitted.

Next, we will return to the description of the flowchart of FIG. 23.

In step 2303, the storage controller 701 executes the subprogram 3 by the processor 708.

In step 2304, the storage controller 701 reads the DPC status of the target switch port from the drive slot management table 1600. When DPC triggered is indicated in the two target switch ports, that is, when the shutdown LED corresponding to the target drive slot is turned on (Y), the procedure advances to step 2306. In other cases (N), that is, if the shutdown LED corresponding to the target drive slot is not turned on, the procedure advances to step 2305.

In step 2305, the storage controller 701 causes the shutdown LED corresponding to the target drive slot to blink.

In step 2306, the operator removes the target SSD from the drive slot having the location LED turned on and the shutdown LED blinking or turned on. As a result of the removal, the DPC is triggered in the target switch port, and the interrupt handler of FIG. 25 is executed. In other words, according to embodiment 3, the DPC is triggered by the removal of the target SSD.

In step 2307, the storage controller 701 deletes the entry related to the target SSD from the drive management table 1500 and the drive slot management table 1600. Further, the storage controller 701 turns off the location LED corresponding to the target drive slot.

Figure 25:
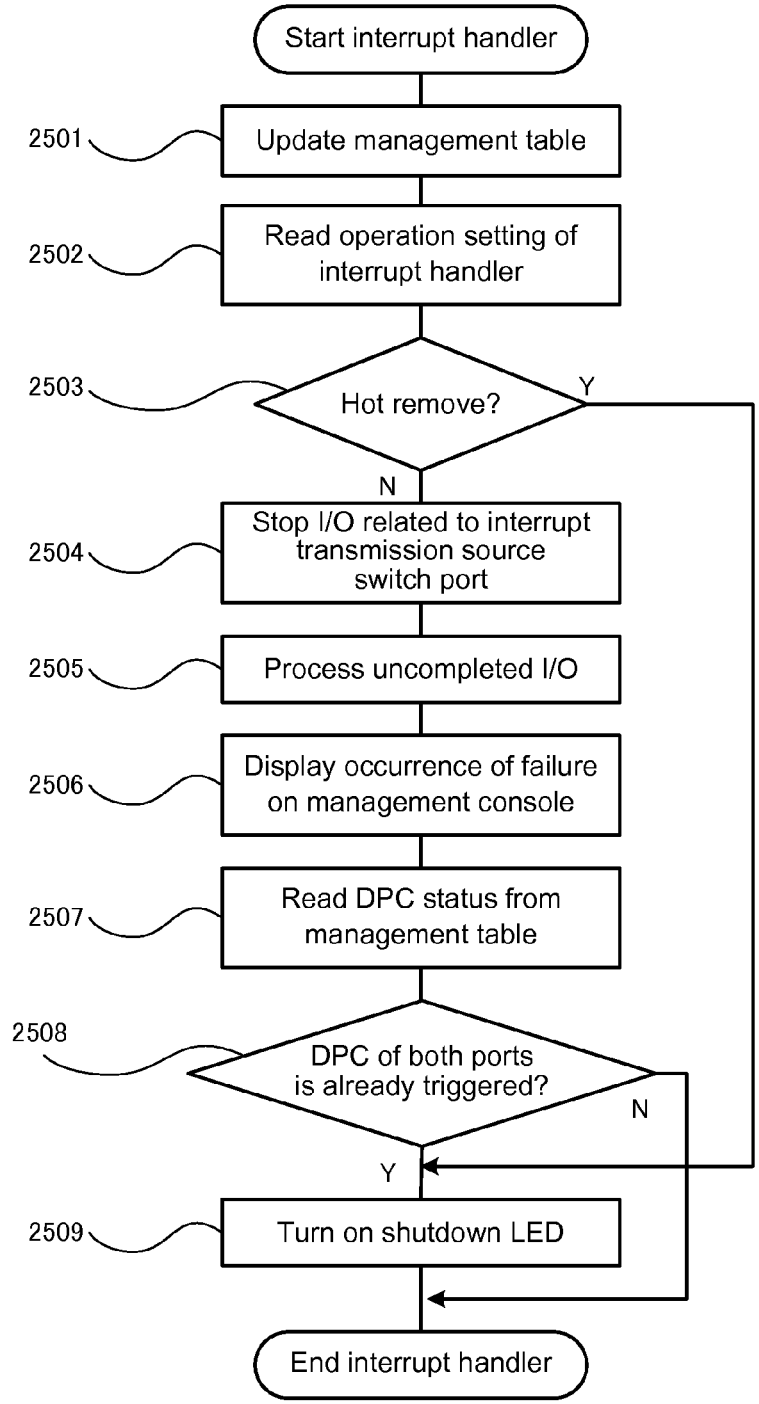
FIG. 25 is a flowchart of interrupt handler triggered within the flow of removing the SSD according to embodiment 3.

FIG. 25 is a flowchart of the interrupt handler according to embodiment 3.

The flowchart of FIG. 25 is the same as the flowchart of FIG. 3, except for step 2503, wherein in step 2503, if the operation of the interrupt handler is set to hot remove, the procedure advances to step 2509. Since the interrupt handler is executed as a result of removal of the target SSD, it is possible to omit the confirmation of the DPC status.

As the remaining steps of FIG. 25 are similar to FIG. 3, the descriptions thereof are omitted. Further, regarding the process of the interrupt handler according to embodiment 3, embodiment 3 can be executed even if the flowchart of FIG. 3 is performed in place of the flowchart of FIG. 25.

The removal of the SSD according to embodiment 3 is completed.

According to embodiment 3, the operator can remove the SSD safely according to the display of the shutdown LED, similar to embodiment 1.

Embodiment 4

Now, the method for removing the cable according embodiment 4 will be described with reference to FIGS. 26 and 27.

At first, the outline of the flow for removing the cable from the cable slot according to embodiment 4 will be shown.

1) The I/O operation related to the target cable is stopped.
2) The operation of the interrupt handler is set to removal.
3) The DPC is triggered in the target switch port by software.
4) The LED provided in correspondence to the target cable slot shows a state where the preparation of the removal of the cable has been completed.

Figure 26:
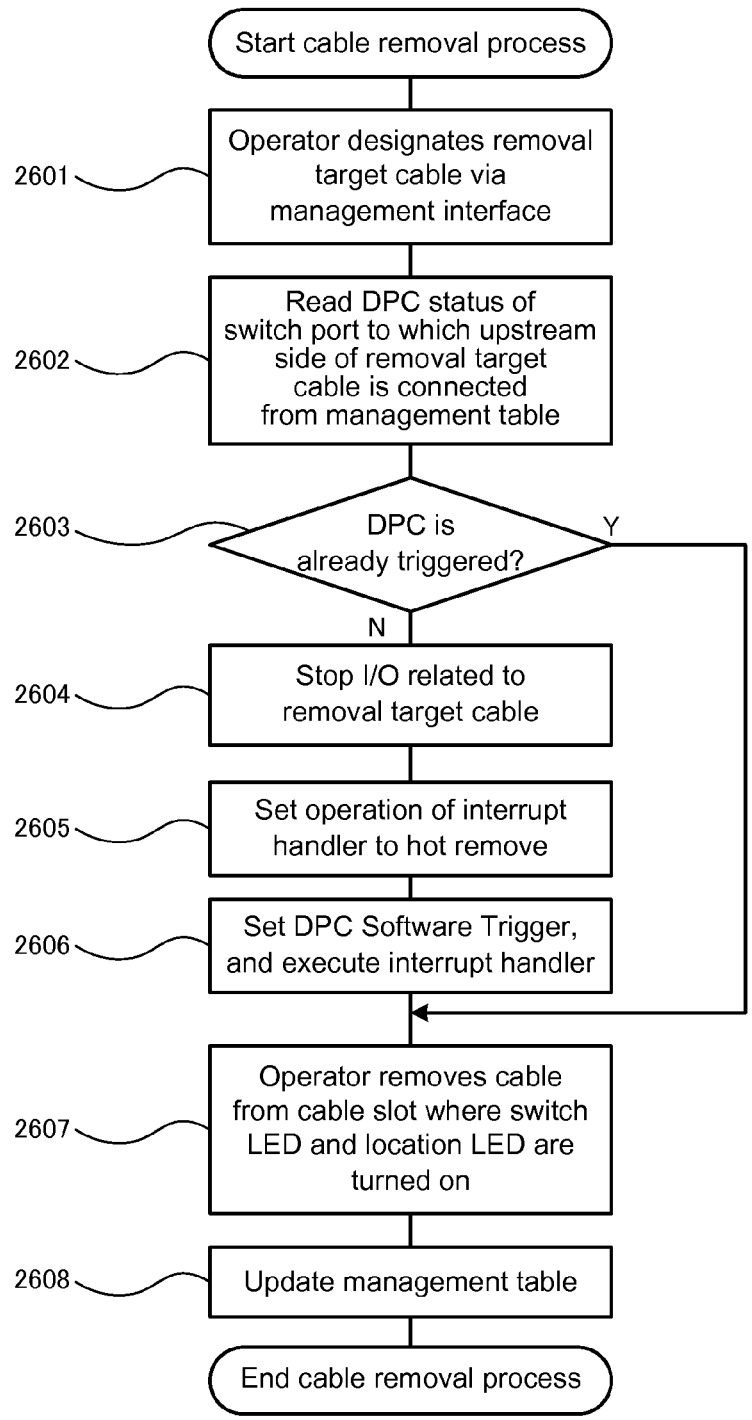
FIG. 26 is a flowchart of removing a cable according to embodiment 4.

FIG. 26 is a flowchart of the cable removal process according to embodiment 4 of the present invention.

In step 2601, the operator of the storage subsystem 700 designates the target cable in the storage controller 701 via the management interface 714. The storage controller 701 turns on the location LED corresponding to the target cable slot.

In step 2602, the storage controller 701 reads the entry of the DPC status 1804 of the target switch port from the management table 1800.

In step 2603, the storage controller 701 proceeds to step 2604 if the DPC is not triggered (N) in the target switch port, and proceeds to step 2607 if the DPC is already triggered (Y).

In step 2604, the storage controller 701 stops the I/O related to the target cable.

In step 2605, the storage controller 701 sets the operation of the interrupt handler to "hot remove". In other words, in the cable slot management table 1800 the entry of the hot remove control 1805 corresponding to the target cable slot is rewritten from "OFF" to "ON".

In step 2606, the storage controller 701 sets the "DPC Software Trigger bit" of the target switch port. As a result, the DPC is triggered and interrupt is transmitted from the switch to the processor 702 or the processor 708. The processor 702 or 708 having received the interrupt executes the interrupt handler.

Now, we will explain the flowchart of the interrupt handler, before returning to the explanation of the flowchart of FIG. 26.

Figure 27:
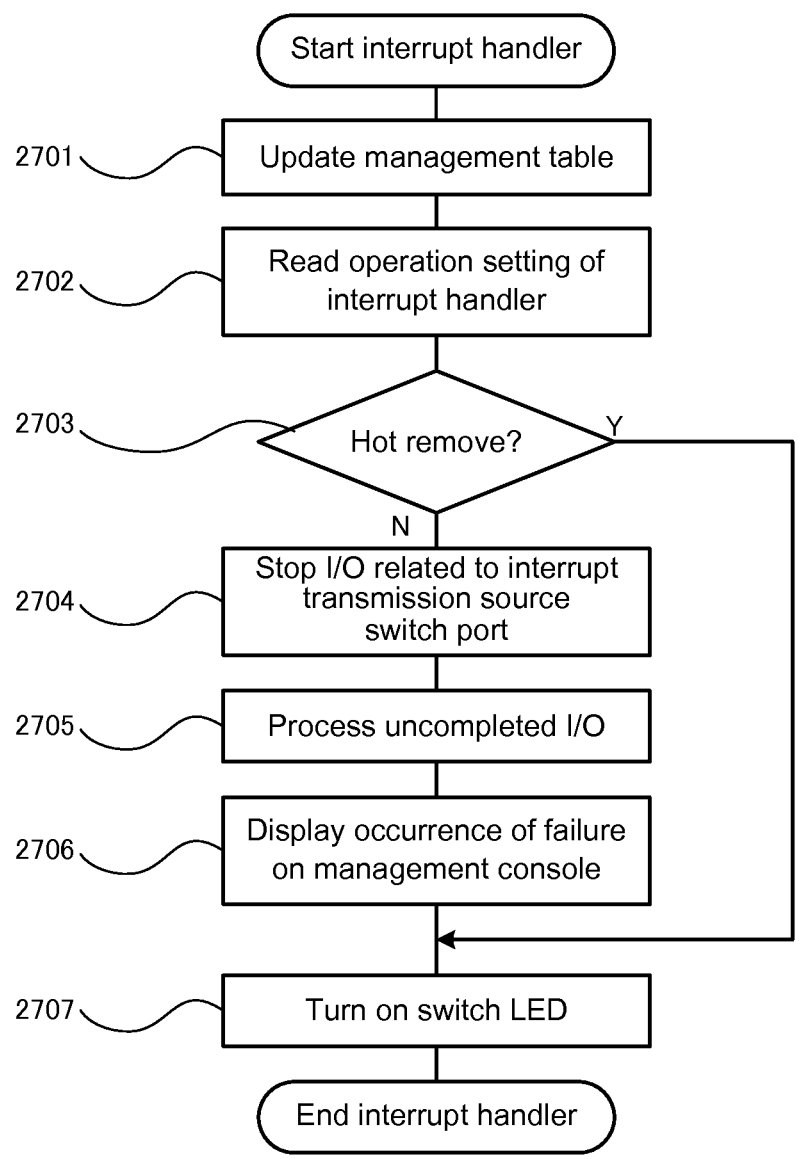
FIG. 27 is a flowchart of an interrupt handler triggered within the flow of removing a cable according to embodiment 4.

FIG. 27 is a flowchart of the interrupt handler.

In step 2701, the interrupt handler updates the DPC status 1804 of the target switch port in the cable slot management table 1800.

In step 2702, the interrupt handler reads the entry of the hot remove control corresponding to the target cable slot from the cable slot management table 1800.

In step 2703, if the read result is "ON (hot remove)" (Y), the procedure advances to step 2707. If the read result is "OFF (not hot remove)", the procedure advances to step 2704.

Steps 2704 to 2706 show the process when DPC has been triggered without prior notification to the storage controller 701, that is, when failure has occurred.

In step 2704, the interrupt handler stops issuing a new I/O regarding the interrupt transmission source switch port.

In step 2705, the interrupt handler aborts the processing of the outstanding I/O regarding the interrupt transmission source switch port.

In step 2706, the interrupt handler displays on the management interface 714 that failure has been detected in the interrupt transmission source switch port.

In step 2707, the interrupt handler turns on the switch LED corresponding to the target cable slot.

Thus, the interrupt handler is ended.

Next, we will return to the description of the flowchart of FIG. 26.

In step 2607, the operator removes the target cable from the cable slot having the location LED and the switch LED turned on.

In step 2608, the storage controller 701 deletes the entry related to the target cable from the cable slot management table 1800. Further, the storage controller 701 turns off the location LED corresponding to the target cable slot.

Thus, the removal of the cable according to embodiment 4 is completed.

According to embodiment 4, the operator can remove the cable safely based on the display of the switch LED corresponding to the cable slot to which the upstream side of the cable is connected.

Embodiment 5

Now, the method for removing the cable according to embodiment 5 will be described with reference to FIGS. 28 and 29.

At first, the outline of the flow for removing the cable from the cable slot according to embodiment 5 will be described.

1) The I/O operation related to the target cable is stopped.
2) The operation of the interrupt handler is set to removal.
3) The LED provided in correspondence to the target cable slot shows a state that removal preparation of the target cable is complete.
4) The DPC is triggered in the target switch port by removing the target cable from the target drive slot.
5) The LED provided in correspondence to the target cable slot shows a state where the removal of the cable has been completed.

Figure 28:
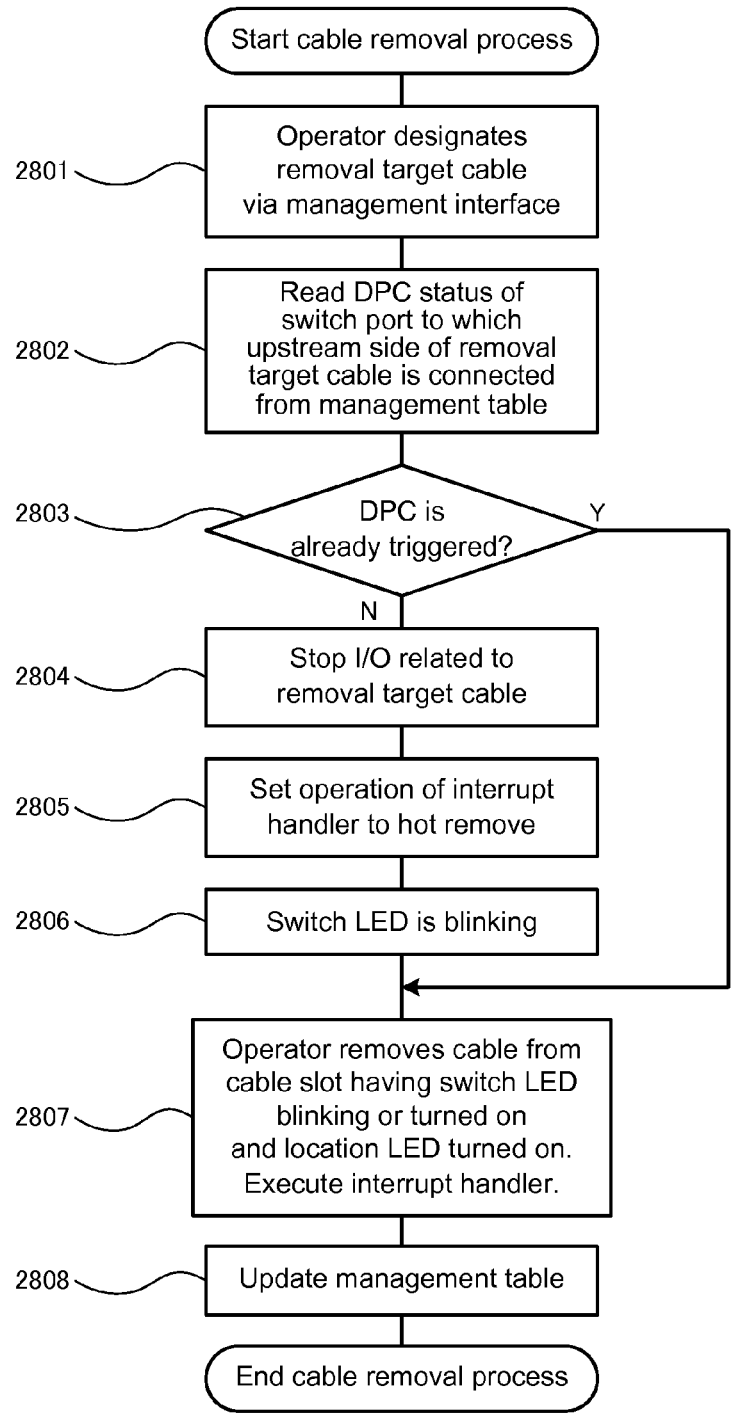
FIG. 28 is a flowchart of removing a cable according to embodiment 5.

FIG. 28 is a flowchart of removing the cable according to embodiment 5.

The flowchart of FIG. 28 is the same as the flowchart of FIG. 26, except for two steps (2806 and 2807).

In step 2806, the storage controller 701 causes the switch LED corresponding to the target cable slot to blink. Embodiment 5 differs from embodiment 4 in that triggering of DPC via software is not performed.

In step 2807, the operator of the storage subsystem removes the target cable from the cable slot having the location LED turned on and the switch LED is either blinking or turned on. Embodiment 5 differs from embodiment 4 in that DPC is triggered by the removal of the cable.

As the other steps of FIG. 28 are the same as the flowchart of FIG. 26, descriptions thereof are omitted.

Figure 29:
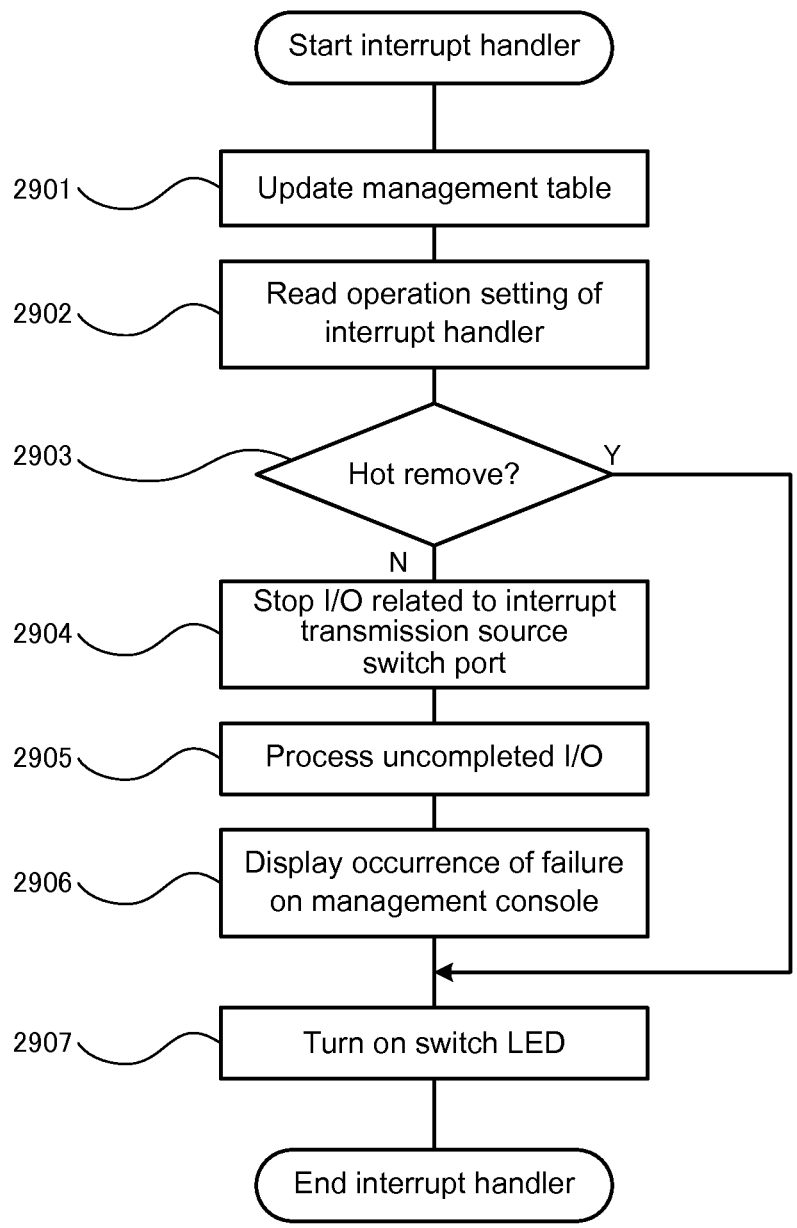
FIG. 29 is a flowchart of an interrupt handler triggered within the flow of removing a cable according to embodiment 5.

FIG. 29 is a flowchart of the interrupt handler started within the cable removal flow according to embodiment 5. The flowchart of FIG. 29 is the same as the flowchart of FIG. 27 except from the timing at which the interrupt handler is triggered, so the descriptions thereof are omitted.

According to embodiment 5, the operator can remove the cable safely according to the display of the switch LED corresponding to the cable slot to which the upstream side of the cable is connected, similar to embodiment 4.

Embodiment 6

Now, the method for removing the SSD according to embodiment 6 will be described with reference to FIGS. 30 and 31.

At first, the outline of the flow for removing the SSD from the drive slot according to embodiment 6 will be described.

1) The I/O operation related to the target cable is stopped.
2) The interrupt transmission accompanying triggering of DPC is invalidated.
3) The DPC is triggered in the target switch port by software.
4) The LED provided in correspondence to the target drive slot shows a state where the preparation of removal of SSD is completed.

Figure 30:
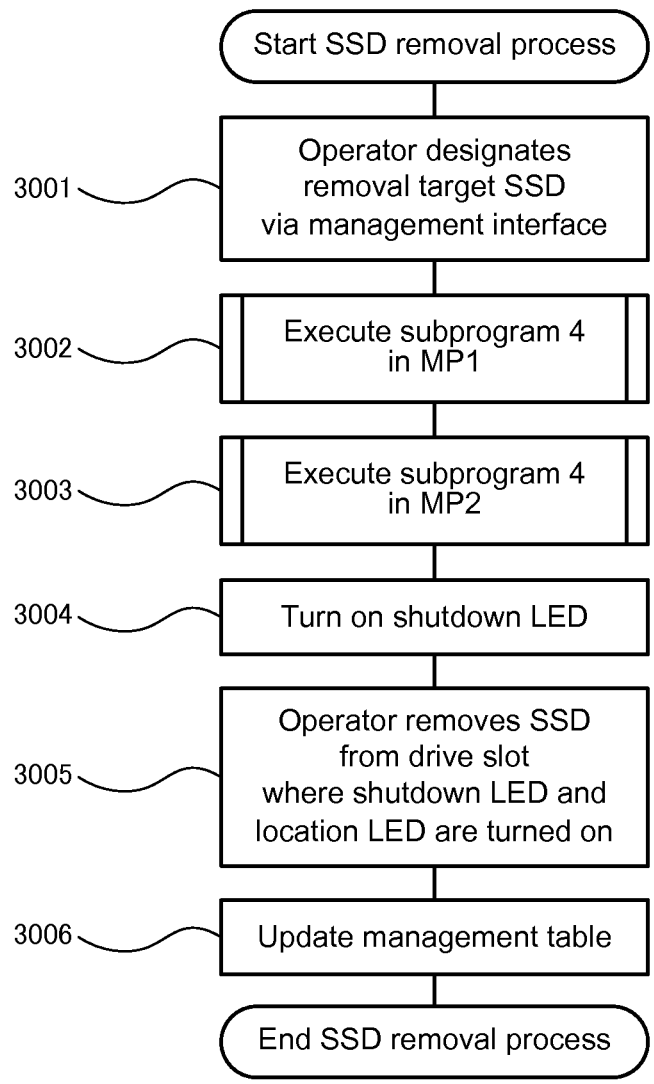
FIG. 30 is a flowchart of removing the SSD according to embodiment 6.

FIG. 30 is a flowchart showing the removal of SSD according to embodiment 6.

The flowchart of FIG. 30 differs from the flowchart of FIG. 1 in that the contents of the subprogram executed in steps 3002 and 3003 differ and that step 3004 is added.

Figure 31:
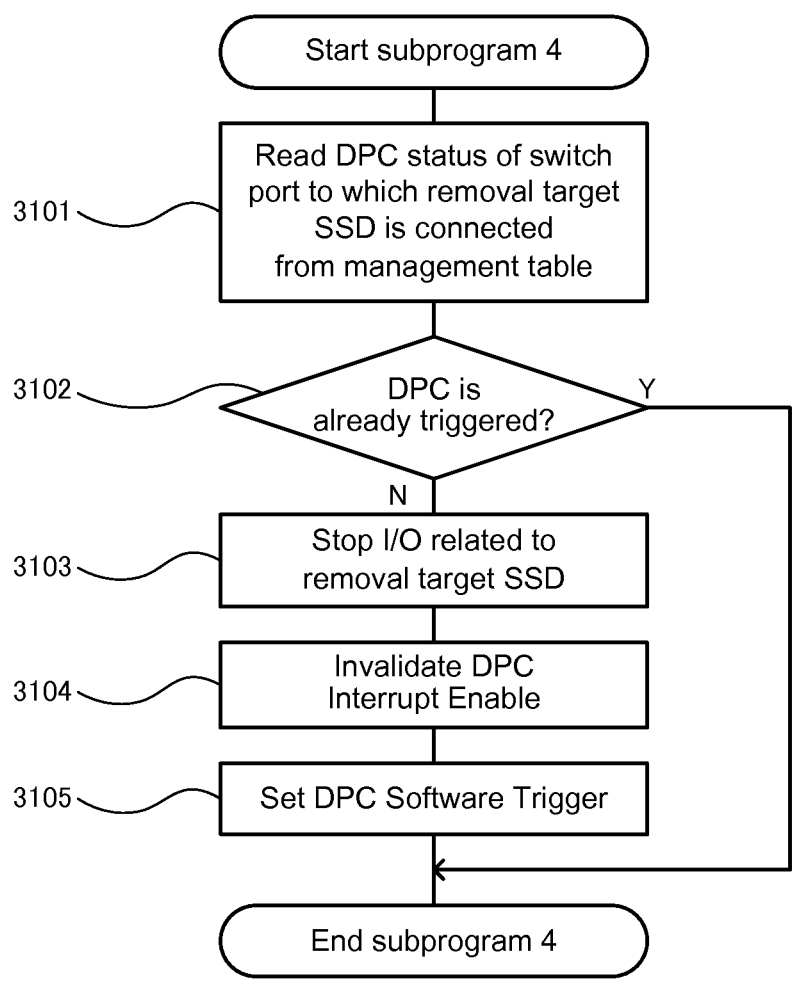
FIG. 31 is a flowchart of a subprogram executed within the flow of removing the SSD according to embodiment 6.

In step 3002, the storage controller 701 executes the subprogram 4 shown in FIG. 31 by the processor 702.

In step 3003, the storage controller 701 executes the subprogram 4 shown in FIG. 31 by the processor 708.

In step 3004, the storage controller 701 turns on the shutdown LED corresponding to the target drive slot.

The other steps of FIG. 30 are the same as the flowchart of FIG. 1, so the descriptions thereof are omitted.

FIG. 31 is a flowchart of subprogram 4 executed within the SSD removal flow according to embodiment 6.

The flowchart of FIG. 31 differs from the flowchart of FIG. 2 in that the contents executed in step 3104 differ.

In step 3104, the storage controller 701 invalidates the "DPC Interrupt Enable" of the target switch port. Even when the DPC is triggered in the target switch port, interrupt will not be transmitted. In other words, embodiment 6 differs from embodiment 1 in that interrupt handler accompanying triggering of the DPC will not be executed.

The other steps of FIG. 31 are the same as the flowchart of FIG. 2, so the descriptions will be omitted.

As described, according to embodiment 6, interrupt accompanying the triggering of DPC will not be transmitted, so that the interrupt handler will not be executed. In other words, according to the method for removing the SSD according to embodiment 6, the load of the processor accompanying the execution of interrupt handler can be reduced.

Embodiment 7

Now, the method for removing the cable according to embodiment 7 of the present invention will be described with reference to FIG. 32.

At first, the outline of the flow for removing a cable from a cable slot according to embodiment 7 will be described.

1) The I/O operation related to the target cable is stopped.

2) The interrupt transmission accompanying triggering of DPC is invalidated.

3) The DPC is triggered in the target switch port by software.

4) The LED provided in correspondence to the target cable slot shows a state where the preparation of removal of the cable is completed.

Figure 32:
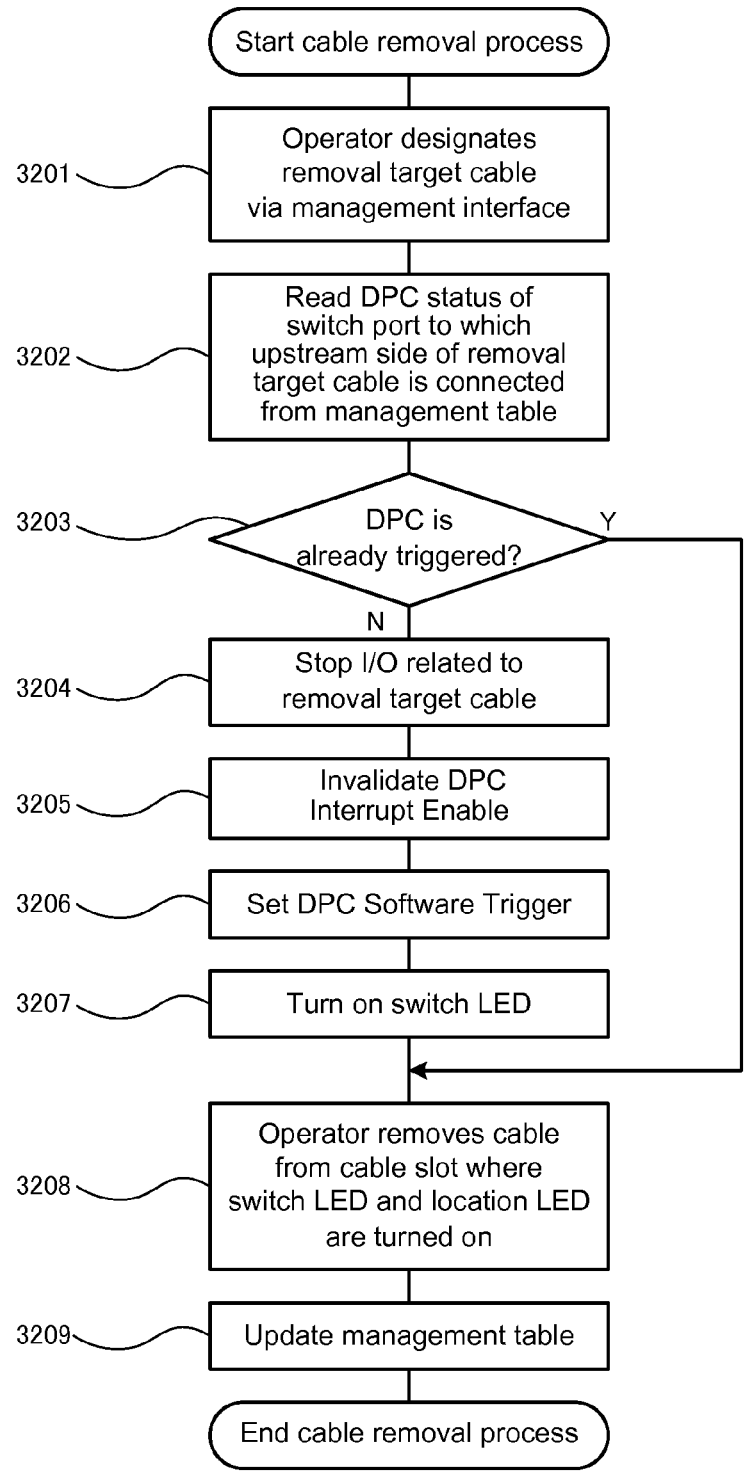
FIG. 32 is a flowchart of removing a cable according to embodiment 7.

FIG. 32 is a flowchart of the cable removal process according to embodiment 7.

The flowchart of FIG. 32 differs from the flowchart of FIG. 26 in that step 3205 is executed in place of steps 2604 and 2605, and that step 3207 is added.

In step 3205, the storage controller 701 invalidates the "DPC Interrupt Enable" of the target switch port. Thereby, even when the DPC is triggered in the target switch port, interrupt will not be transmitted. In other words, unlike embodiment 4, embodiment 7 will not execute the interrupt handler accompanying the triggering of DPC.

In step 3205, the storage controller 701 causes the switch LED corresponding to the target cable slot to be turned on.

As the other steps of FIG. 32 are the same as the flowchart of FIG. 26, descriptions thereof are omitted.

As described, according to embodiment 7, the interrupt accompanying the triggering of DPC will not be transmitted, so that the interrupt handler will not be executed. In other words, according to the cable removal method of embodiment 7, it becomes possible to reduce the processor load accompanying the execution of interrupt handler.

Embodiment 8

Now, the storage subsystem according to embodiment 8 will be described with reference to FIGS. 35 and 36.

In embodiment 8, as an outline of the process, when failure occurs to one of the two switches within the drive enclosure, the failure is detected by the link connecting the two switches. Next, the switch in which failure has occurred is set to connect to the downstream side of a normal switch using the link.

Figure 35:
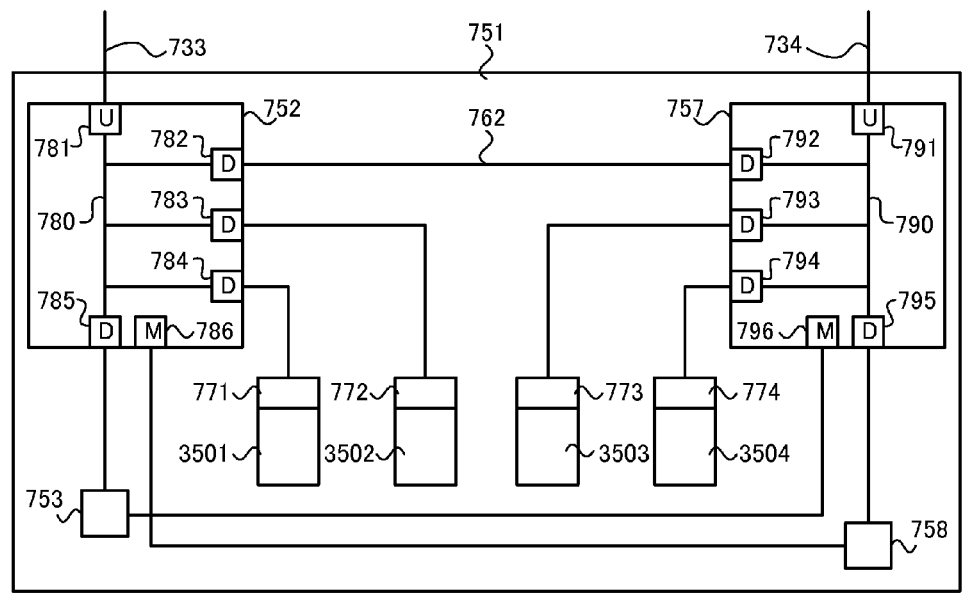
FIG. 35 is a view showing a drive enclosure according to embodiment 8.
Figure 36:
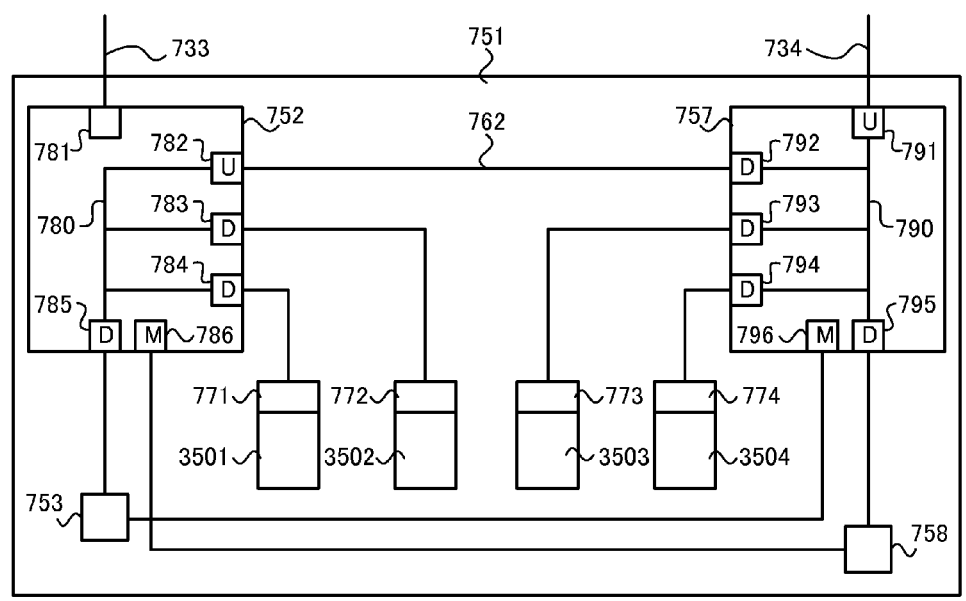
FIG. 36 is a view showing a drive enclosure after failover according to embodiment 8.

FIG. 35 is a view showing the drive enclosure 751 according to FIG. 7. In FIG. 35, compared to FIG. 7, the wiring related to the HDD is not shown, and single port SSD 3501 through 3504 connected to connectors 771 through 774 are shown in addition.

The switch 752 has an upstream port 781, downstream ports 782 through 785, and a management port 786. The upstream port 781 and the downstream ports 782 through 785 are connected via a virtual PCI bus 780. More accurately, a virtual PCI-PCI bridge is connected to the virtual PCI bus 780. In the example, the upstream port 781 and the downstream ports 782 through 785 are equipped with the virtual PCI-PCI bridge. Further, the management port 786 is a port capable of inputting and outputting setup information during initialization of the switch 752 from the processor 708, and for example, the setting of the upstream side or the downstream side of the respective switch ports can be changed. Each downstream port of the switch 752 is capable of using DPC.

The switch 757 has an upstream port 791, downstream ports 792 through 795, and a management port 796. The upstream port 791 and the downstream ports 792 through 795 are connected via a virtual PCI bus 790. Similar to the switch 752, the upstream port 791 and downstream ports 792 through 795 have virtual PCI-PCI bridges. Further, the management port 796 is a port capable of inputting and outputting setup information during initialization of the switch 757 from the processor 702, and for example, the setting of the upstream side or the downstream side of the respective switch ports can be changed. Each downstream port of the switch 757 is capable of using DPC.

The storage controller 701 is capable of performing fundamental reset and entering of setup information of the switch 757 via the enclosure control unit 753 and the management port 796. Similarly, the storage controller 701 is capable of performing reset and entering of setup information of the switch 752 via the switch 757, the enclosure control unit 758 and the management port 786.

A signal line 762 is a cross-link connecting the downstream port 782 and the downstream port 792. During normal operation of the storage subsystem 700, DPC is validated in the downstream port 782 and the downstream port 792, and the signal line 762 is set to link-up.

In the storage subsystem 700, it is possible to perform cascade connection of n-stages (n being an integer of 1 or more) of drive enclosure 751 with respect to the storage controller 701, and the number of stages of switch connection (n-stages) from the storage controller 701 is the same in the two switches equipped in the same drive enclosure. Further, as shown in FIG. 35, in the drive enclosure 751 storing a single port SSD, the downstream port 782 and the downstream port 792 supporting the DPC of the n-th switches 752 and 757 are connected via cross-link.

Next, a failover operation in embodiment 8 will be described with reference to FIG. 36.

Now, we will assume that a failure has occurred in which the link related to the cable 733 is brought down. However, it is assumed that there is no failure in the hardware of the switch 752, and that the storage controller 701 can change the setting of the switch 752 via the management port 786. Since the link connected to the upstream port 781 is brought down, link-down occurs in all the downstream ports 782 through 785 of the switch 752. As a result, the storage controller 701 cannot access single port SSDs 3501 and 3502.

The link-down of the signal line 762 triggers DPC in the downstream port 792 of the switch 757. By transmitting interrupt from the switch 757 accompanying triggering of the DPC, the storage controller 701 can detect that failure related to the switch 752 has occurred.

The storage controller 701 having detected failure accesses the switch 752 via the management port 786, and isolates the switch port 781 from the virtual PCI bus 780.

Next, the storage controller 701 changes the setting of the switch port 782 from the downstream port to the upstream port via the management port 786, and performs fundamental reset of the switch 752.

Next, in the downstream port 792 of the switch 757, the storage controller 701 clears the "DPC Trigger Status bit" of the DPC status register 600. As a result, the downstream port 792 and subsequent ports are subjected to link-up. The switch 752 is subjected to hot reset by the new setting in which the switch port 782 is set as the upstream port.

After the switch 752 is subjected to hot reset, the storage controller 701 enables access of the single port SSDs 3501 and 3502 via the switches 757 and 752.

The drive enclosure 751 has a similar configuration as the drive enclosure 721 of FIGS. 11 through 13. The switch package 1210 of the drive enclosure 751 has a switch 752, an enclosure control 753 and switch LEDs 1211 and 1215. The switch package 1230 of the drive enclosure 751 has a switch 757, an enclosure control 758 and switch LEDs 1231 and 1235.

As described, in the drive enclosure 751, the switch 752 may be used even when the cable 733 is linked down. Then, when both the cable 733 and the signal line 762 are linked down, the switch LED 1211 of the drive enclosure 751 is caused to turn on. The operator of the storage subsystem 700 can remove the switch package 1210 of the drive enclosure 751 when the switch LED 1211 of the drive enclosure 751 is turned on.

Similarly, when both the cable 734 and the signal line 762 are linked down, the switch LED 1231 of the drive enclosure 751 is caused to turn on. The operator of the storage subsystem 700 can remove the switch package 1230 of the drive enclosure 751 when the switch LED 1231 of the drive enclosure 751 is turned on.

The process for removing the single port SSDs 3501 to 3504 is similar to the process regarding the dual port SSD according to embodiment 1 and the like, except for that there is only one switch port to which the SSD is connected.

The preferred embodiments of the present invention has been described in detail above, but the present invention is not restricted to the embodiments, and can be modified in various ways without deviating from the scope of the invention.

An example has been illustrated in which the HDD and the SSD share the use of the connector in a drive enclosure, but the method for removing the SSD according to the present invention can be applied to an example in which the SSD is connected to a connector exclusive for SSDs in a drive enclosure exclusive for SSDs.

REFERENCE SIGNS LIST

700 Storage subsystem
701 Storage controller
721, 751 Drive enclosure
702, 708 Processor
705, 711 Memory
722, 727, 752, 757 (PCI-Express) switch
703, 709 Front-end interface
706, 712 Back-end interface
724, 729, 754, 759 Expander
707, 713 Downstream port
723, 728, 753, 758 Enclosure control unit
741-744, 771-774 Connector
714 Management interface

The invention claimed is:

1. A storage subsystem comprising:
a storage controller having a first processor and a second processor;
one or more drive slots to which a hard disk drive or a solid state drive having multiple ports are inserted;
a first switch and a second switch composed of a PCI-express switch having a port for supporting a downstream port containment (DPC), wherein the first switch connects the solid state drive via the port to the first processor and the second switch connects the solid state drive via the port to the second processor; and
a display means for displaying whether removal of the hard disk drive or the solid state drive inserted to the drive slot is enabled or not; wherein
when the hard disk drive is inserted to the drive slot,
if power supply to the hard disk drive is stopped, the display means displays that removal of the hard disk drive is enabled;
when the solid state drive is inserted to the drive slot,
if DPC is triggered in both the port of the first switch and the port of the second switch connecting the solid state drive, the display means displays that removal of the solid state drive is enabled.

2. The storage subsystem according to claim 1, wherein when removing the solid state drive from the drive slot,
in a state where input and output operation related to the solid state drive is stopped by the first and second processors, the first and second switches connected to the solid state drive of removal target transmits interrupt to the first and second processors by triggering DPC in the ports provided in the respective switches, and
the first and second processors can display on the display means that the solid state drive can be removed in response to the interrupt transmitted from the first and second switches.

3. The storage subsystem according to claim 1, wherein when removing the solid state drive from the drive slot,
the first and second processors stop the input and output operation related to the solid state drive, and displays on the display means that the solid state drive can be removed; and
the first and second switches connecting the removal target solid state drive causes the DPC to be triggered in the port that each switch has accompanying the removal of the solid state drive from the drive slot, by which interrupt is transmitted to the first and second processors.

4. The storage subsystem according to claim 1, wherein when removing the solid state drive from the drive slot, the first and second processors:
stop the input and output operations related to the solid state drive, and invalidate the transmission of interrupt from the first and second switches by the triggering of DPC; and
when DPC is triggered in the port respectively provided in the first and second switches connecting the removal target solid state drive, it is displayed on the display means that the solid state drive can be removed.

5. The storage subsystem according to claim 1, wherein when attaching the solid state drive to the drive slot, the first and second processors cause the display means to display that removal of the solid state drive is not possible after cancelling DPC in both the first switch port and the second switch port connected to the solid state drive inserted to the drive slot.

6. The storage subsystem according to claim 1, wherein the storage subsystem has an enclosure for storing the hard disk drive or the solid state drive;

the storage controller has a first downstream port positioned on an upstream side of the first switch and for connecting the first switch;

the first switch has a second downstream port for connecting a different switch supporting DPC on the downstream side; and the enclosure has a display means for displaying whether DPC is triggered or not in the first downstream port, and a display means for displaying whether DPC is triggered or not in the second downstream port.

7. A storage subsystem comprising:

a storage controller having a first processor and a second processor;

one or more drive slots to which a hard disk drive or a solid state drive having a single port is inserted;

a first switch and a second switch composed of a PCI-express switch having a port for supporting a downstream port containment (DPC), wherein the first switch connects the solid state drive via the port to the first processor and the second switch connects the solid state drive via the port to the second processor; and a display means for displaying whether removal of the inserted drive is enabled or not in correspondence to the drive slot in which the hard disk drive or the solid state drive is inserted; wherein when the hard disk drive is inserted to the drive slot, if power supply to the hard disk drive is stopped, the display means displays that removal of the hard disk drive is enabled;

when the solid state drive having a single port is inserted to the drive slot, if DPC is triggered in the port of the first switch having the solid state drive connected thereto or the port of the second switch, the display means displays that removal of the solid state drive is enabled, and the downstream port of the first switch and the downstream port of the second switch are connected via a first link;

when failure occurs to either one of the upstream side connection of the first switch or the upstream side connection of the second switch, DPC is triggered in the downstream port of the first or second switch on the other side of the connection where connection is normal, the downstream port of the first or second switch on the side of the connection where failure has occurred is changed to an upstream port, the DPC of the downstream port of the first or second switch on the normal connection side is cancelled, and access to the drive is enabled via the first link.

8. The storage subsystem according to claim 7, further comprising:

an enclosure for storing a solid state drive having the single port; and the first switch and the second switch are arranged in the enclosure to connect to the storage controller.

9. The storage subsystem according to claim 8, wherein the enclosure is connected to the storage controller via cascade connection of n-stages (where n is an integer of 2 or more).

* * * * *